US011296470B2

(12) United States Patent
Mizrahi et al.

(10) Patent No.: US 11,296,470 B2
(45) Date of Patent: Apr. 5, 2022

(54) BATTERY PACK WITH ELECTRICAL CONNECTOR MECHANISM THAT MAINTAINS WATERPROOF INTEGRITY OF PORTABLE ELECTRONIC DEVICE

(71) Applicant: MIZCO INTERNATIONAL, INC., Avenel, NJ (US)

(72) Inventors: Maurice Mizrahi, Brooklyn, NY (US); David Goetz, Avenel, NJ (US); John Elliot, Avenel, NJ (US)

(73) Assignee: Mizco International, Inc., Avenel, NJ (US)

( * ) Notice: Subject to any disclaimer, the term of this patent is extended or adjusted under 35 U.S.C. 154(b) by 58 days.

(21) Appl. No.: 16/476,042

(22) PCT Filed: Jan. 4, 2018

(86) PCT No.: PCT/US2018/012430
§ 371 (c)(1),
(2) Date: Jul. 3, 2019

(87) PCT Pub. No.: WO2018/129218
PCT Pub. Date: Jul. 12, 2018

(65) Prior Publication Data
US 2019/0348806 A1 Nov. 14, 2019

Related U.S. Application Data

(60) Provisional application No. 62/442,372, filed on Jan. 4, 2017.

(51) Int. Cl.
*H01M 2/10* (2006.01)
*H01R 33/965* (2006.01)
(Continued)

(52) U.S. Cl.
CPC ......... *H01R 33/965* (2013.01); *G06F 1/1632* (2013.01); *H01M 50/209* (2021.01);
(Continued)

(58) Field of Classification Search
CPC .... G06F 1/1632; G06F 1/1635; G06F 1/1656; H01M 2220/30; H01M 50/209;
(Continued)

(56) References Cited

U.S. PATENT DOCUMENTS

2005/0003709 A1* 1/2005 Nagamine ............ H01R 43/005
439/587
2010/0060747 A1* 3/2010 Woodman ............ G03B 17/08
348/222.1
(Continued)

OTHER PUBLICATIONS

PCT/US2018/012430. International Search Report and Written Opinion (dated Mar. 19, 2 018). 12 pages.

*Primary Examiner* — Victoria H Lynch
(74) *Attorney, Agent, or Firm* — Quarles & Brady LLP

(57) ABSTRACT

A battery pack for electrically coupling with and securing to a portable electronic device having a device connector and one or more user interface components includes an electronics section and a latch section. The electronics section includes a battery compartment configured to hold one or more batteries and a connector mechanism configured to interconnect with and form a waterproof seal around the device connector. The latch section is pivotably coupled to the base portion and configured to pivot relative to the base portion to transition the battery pack between open and closed states. In the open state, the electronics section and the latch section form an open frame structure configured to enable installation of the portable electronic device in the battery pack. In the closed state, the electronics section and the latch section form a closed frame structure configured to (Continued)

secure the portable electronic device within an opening defined by the closed frame structure.

38 Claims, 17 Drawing Sheets

(51) Int. Cl.
*G06F 1/16* (2006.01)
*H01R 13/52* (2006.01)
*H01R 13/631* (2006.01)
*H04B 1/3883* (2015.01)
*H01M 50/209* (2021.01)
*H01M 50/543* (2021.01)
*H04B 1/38* (2015.01)

(52) U.S. Cl.
CPC ...... *H01M 50/543* (2021.01); *H01R 13/5213* (2013.01); *H01R 13/5219* (2013.01); *H01R 13/631* (2013.01); *H04B 1/3883* (2013.01); *H01M 2220/30* (2013.01); *H01R 13/5216* (2013.01); *H04B 2001/3894* (2013.01)

(58) Field of Classification Search
CPC .............. H01M 50/528; H01M 50/543; H01R 13/5202; H01R 13/5213; H01R 13/5216; H01R 13/5219; H01R 13/631; H01R 33/965; H02J 7/0044; H02J 7/0045; H04B 1/3883; H04B 2001/3894; H04N 5/2251; Y02E 60/10
See application file for complete search history.

(56) References Cited

U.S. PATENT DOCUMENTS

| | | |
|---|---|---|
| 2011/0261509 A1 | 10/2011 | Xu et al. |
| 2012/0262618 A1* | 10/2012 | Weakly .................. A45C 11/22 348/333.01 |
| 2013/0104364 A1 | 5/2013 | Carnevali |
| 2013/0107446 A1 | 5/2013 | Carnevali |
| 2016/0197439 A1 | 7/2016 | Mizrahi et al. |

* cited by examiner

BATTERY PACK WITH ELECTRICAL CONNECTOR MECHANISM THAT MAINTAINS WATERPROOF INTEGRITY OF PORTABLE ELECTRONIC DEVICE

CROSS-REFERENCE TO RELATED APPLICATION

This application claims the benefit of U.S. Provisional Application Ser. No. 62/442,372, entitled "Battery Pack with Articulating Connector for Mating with Portable Electronic Device" and filed on Jan. 4, 2017, which is expressly incorporated by reference herein in its entirety.

TECHNICAL FIELD

The present disclosure relates generally to battery packs for portable electronic devices, and more particularly, to a battery pack with a connector mechanism configured to interconnect with a corresponding connector of a portable electronic device and thereby provide extended energy to the electronic device, while also providing a seal at the interconnection that maintains the waterproof integrity of the portable electronic device.

SUMMARY

A battery pack for electrically coupling with and securing to a portable electronic device having a device connector and one or more user interface components includes an electronics section and a latch section. The electronics section includes a battery compartment configured to hold one or more batteries and a connector mechanism configured to interconnect with and form a waterproof seal around the device connector. The latch section is pivotably coupled to the electronics section and configured to pivot relative to the electronics section to transition the battery pack between open and closed states. In the open state, the electronics section and the latch section form an open frame structure configured to enable installation of the portable electronic device in the battery pack. In the closed state, the electronics section and the latch section form a closed frame structure configured to secure the portable electronic device within an opening defined by the closed frame structure.

In one configuration, the electronics section includes a base portion that includes the battery compartment, and a side portion that includes the connector mechanism. The side portion extends in a generally orthogonal direction from the base portion and the connector mechanism extends in a general orthogonal direction from the side portion in the direction of the opening formed by the closed frame structure. Due to the positioning of the connector mechanism on the interior side of the battery pack, interconnection between the connector mechanism and the device connector is enabled during installation of the portable electronic device in the battery pack. In another aspect of this configuration, the connector mechanism of the battery pack extends outward from a surface of the electronics section and is configured such that a connector of the connector mechanism is capable of articulating in at least one direction relative to the surface of the electronics section.

In another configuration, the electronics section includes a base portion that includes the battery compartment, and a side portion that includes a port extending therethrough and a flexible cable that is coupled to the connector mechanism. The side portion extends in a generally orthogonal direction from the base portion. The connector mechanism and port are configured to allow for insertion and removal of the connector mechanism relative to the port. In this configuration, while the connector mechanism is positioned on the exterior of the battery pack, the port provides the connector mechanism access to the interior side of the pack. Accordingly, interconnection between the connector mechanism and the device connector is enabled either during or after installation of the portable electronic device in the battery pack.

In one aspect, the connector mechanism of the battery pack includes a connector configured to interconnect with the device connector and a plug surrounding a portion of the connector. The plug is configured to mate with and sealingly engage with the perimeter walls of a recessed well surrounding the device connector to thereby provide the waterproof seal around the device connector. The plug is sized and configured to flex and compress to allow for insertion into the recessed well, as well as subsequent expansion against the perimeter walls. In one embodiment, the plug is formed of a thermoplastic polyurethane (TPU).

In another aspect, one or more of the electronics section and the latch section comprise one or more features configured to provide direct access to the one or more user interface components of the portable electronic device, when the battery pack is in a closed state. For example, the feature may be an opening that aligns with a button or port of the portable electronic device to provide direct access thereto, unimpeded any part of the battery pack. In another example, the feature may be a notch or channel formed in a surface of one of the electronics section and the latch section that aligns with a sensory input or output, e.g., microphone or speaker, of the portable electronic device to allow for direct access thereto, unimpeded any part of the battery pack.

Regarding direct access provided through an opening of the battery pack, in one configuration, the battery pack further includes a cap configured to sealingly engage with the perimeter of the opening to thereby provide a waterproof seal around the opening. This is beneficial in cases where a waterproof cap of the portable electronic device that usually covers an electrical connector of the device, such as a USB connector, is removed from the device in order to install the device in the battery pack. The cap of the battery pack provides the waterproof protection that would otherwise be provided by the device cap.

In another aspect, the electronics section of the battery pack includes a track having one or more mechanical features, wherein the track is configured to allow for receiving and securing an interchangeable mounting structure. In one embodiment, the one or more mechanical features comprise at least one notch configured to engage with at least one protrusion of the mounting structure.

BRIEF DESCRIPTION OF THE DRAWINGS

Various aspects of battery packs will now be presented in the detailed description by way of example, and not by way of limitation, with reference to the accompanying drawings, wherein.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended to aid the reader in understanding the principles of the embodiments, and are to be construed as being without limitation to such specifically recited examples and conditions. Moreover, all statements herein reciting principles, aspects, and embodiments, as well as specific examples thereof, are intended to encompass equivalents thereof.

Disclosed herein in a battery pack that provides extended energy to portable electronic devices while preserving the functionality, integrity and user experience of the devices. The portable electronic device may be a camera that includes various interface components, such as operation buttons, a lens, a display, connector ports, speakers, microphones, that are associated with various sides or faces of the device. The portable electronic device may also be configured as a waterproof device that provides a seal against the ingress of water to the internal components of the electronic device up to certain depth. For example, the portable electronic device may be a GoPro HERO5 or HERO6 camera that is waterproof up to a depth of 33 feet.

The battery pack comprises a frame structure or casing that establishes a waterproof electrical interconnection between an energy source housed within the battery pack and the portable electronic device, to thereby maintain the specified waterproof integrity of the device. The frame structure of the battery pack is configured to transition between an open state that allows for easy installation and interconnection of the portable electronic device, and a closed state that secures the portable electronic device within the battery pack. Features, e.g., openings, notches, holes, included in the frame structure provide a user direct access to the various interface components of the portable electronic device.

Figure 1:
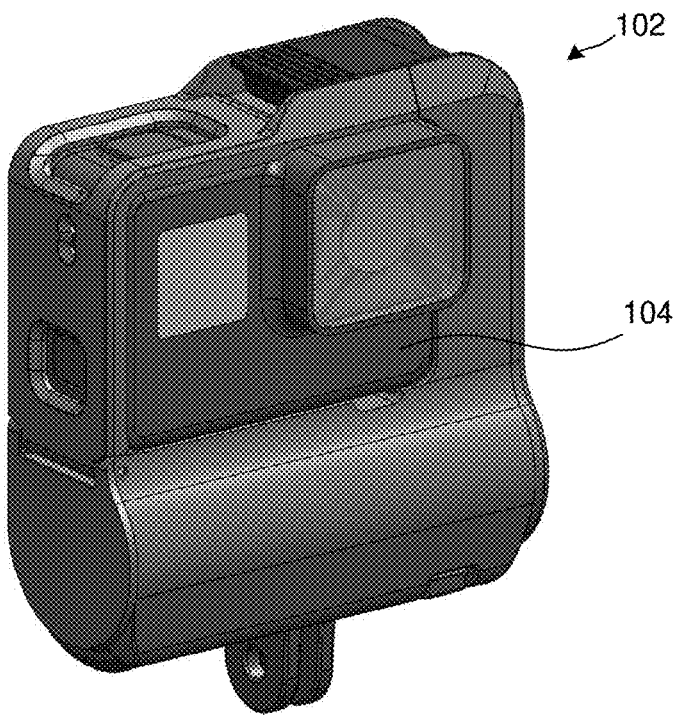
FIG. 1 is a front perspective illustration of a battery pack showing a portable electronic device, e.g., a camera, installed in the battery pack with the front of the portable electronic device visible.
Figure 2:
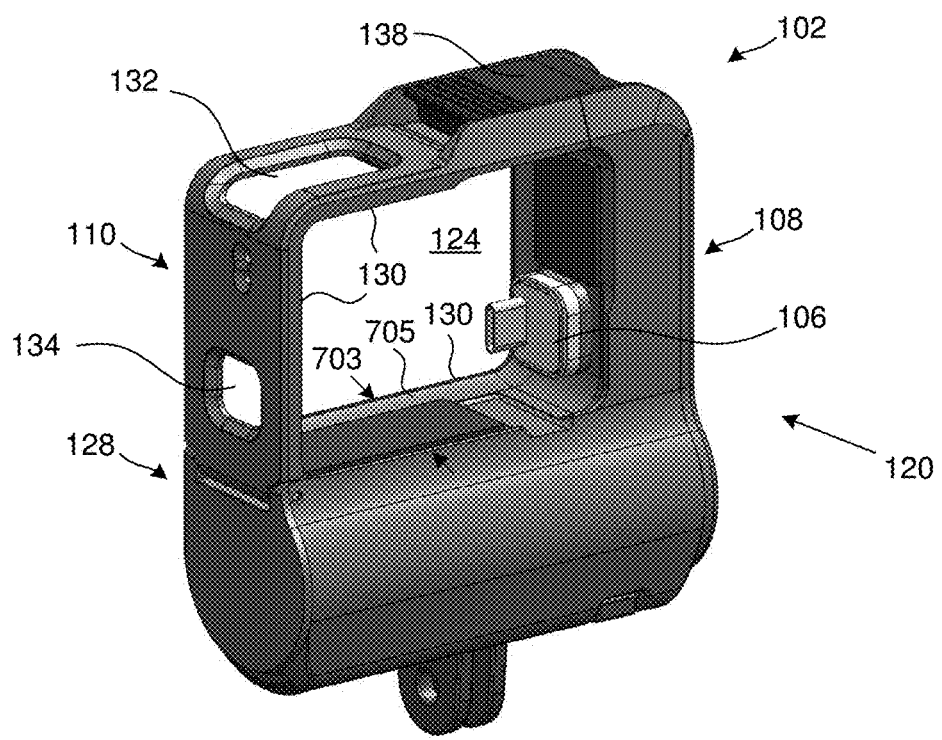
FIG. 2 is a front perspective illustration of the battery pack of FIG. 1 without a portable electronic device installed and showing a connector mechanism located at the interior of the pack.
Figure 3:
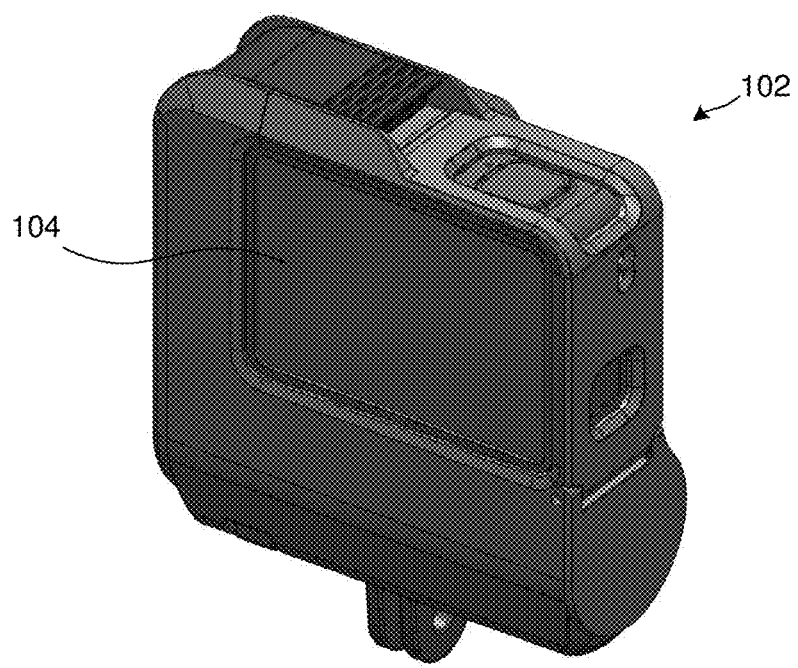
FIG. 3 is a rear perspective illustration of the battery pack of FIG. 1 showing a portable electronic device installed in the battery pack, with the rear display of the portable electronic device visible.
Figure 4:
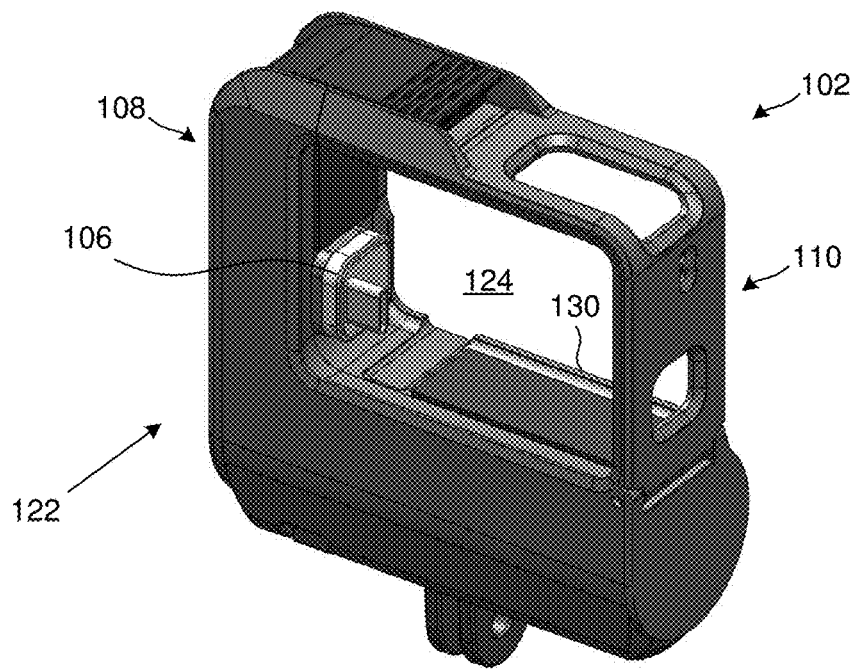
FIG. 4 is a rear perspective illustration of the battery pack of FIG. 3 without a portable electronic device installed and showing the connector mechanism.

FIG. 1 is a front perspective illustration of a battery pack 102 showing a portable electronic device 104, e.g., camera, installed in the battery pack, with the front of the device visible. FIG. 2 is a front perspective illustration of the battery pack 102 of FIG. 1 without a portable electronic device installed, and showing a connector mechanism 106 configured to mate with a connector of the device. FIG. 3 is a rear perspective illustration of the battery pack 102 of FIG. 1 showing a portable electronic device 104 installed in the battery pack, with the rear display of the portable electronic device visible. FIG. 4 is a rear perspective illustration of the battery pack 102 of FIG. 2 without a portable electronic device installed and showing the connector mechanism 106 configured to mate with a connector of a portable electronic device.

Referring to FIGS. 2 and 4, the battery pack 102 includes a first frame section 108 (also referred to as a "electronics section") and a second frame section 110 (also referred to as a "latch section") that is pivotably coupled to the electronics section at a pivot area 128. The electronics section 108 and latch section 110 are made of a plastic material and form a frame structure or casing configured to secure the portable electronic device 104 in place within the frame. Features of the latch section 110, including holes 132, 134, allow for direct access to operation button and connection ports of the portable electronic device 104. Likewise, features of the electronics section 108, including a notch or channel 136 formed in the material of the electronics section allow for direct access to a speaker located at the bottom of the portable electronic device 104.

Figure 26:
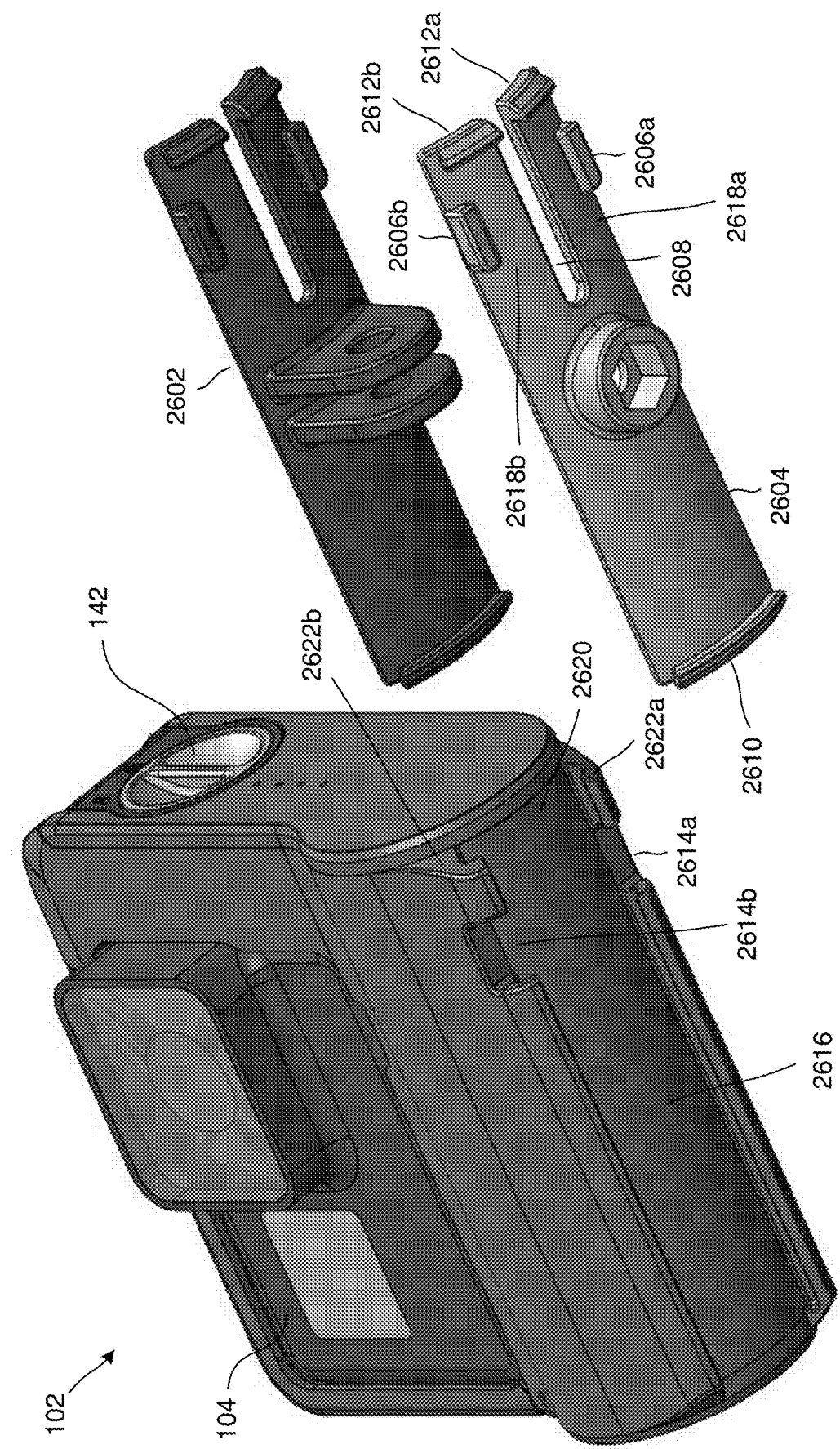
FIG. 26 is a front and bottom perspective illustration of a battery pack, with two interchangeable mounts uninstalled.

With reference to FIG. 26, regarding direct access provided through an opening of the battery pack 102, in one configuration, the battery pack further includes a cap 142 configured to sealingly engage with the perimeter of an opening (not visible) to thereby provide a waterproof seal around the opening. This is beneficial in cases where a waterproof cap of the portable electronic device 104 that usually covers an electrical connector of the device, such as a USB connector, is removed from the device in order to install the device in the battery pack 102. The cap 142 of the battery pack 102 provides the waterproof protection that would otherwise be provided by the removed device cap.

Figure 5:
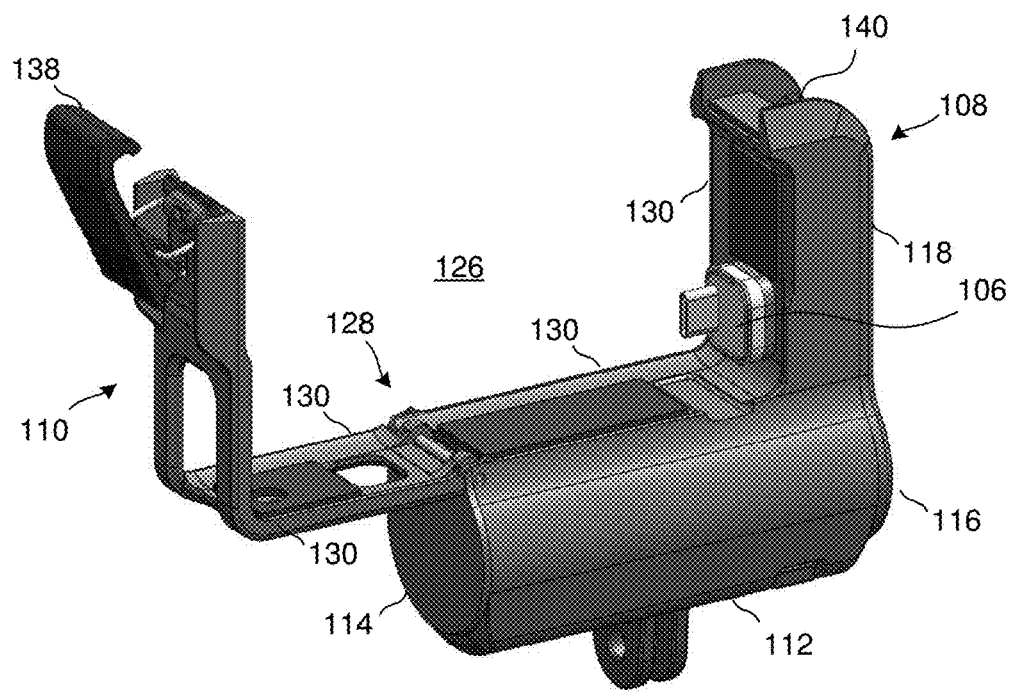
FIG. 5 is a front perspective illustration of the battery pack of FIG. 2 in an open state.

FIG. 5 is a front perspective illustration of the battery pack 102 of FIG. 2 showing the latch section 110 pivoted about the pivot area 128 and relative to the electronics section 108 to form an open configuration or open state of the battery pack. The electronics section 108 includes a first portion 112 (also referred to as a "base portion") having a first-end region 114 and a second-end region 116. The base portion 112 is formed to include a battery compartment configured to hold one or more batteries. The electronics section 108 also includes a second portion 118 (also referred to a "side portion") that extends upward (as shown in FIG. 5) from the first-end region 114 of the base portion 112. The side portion 118 includes the connector mechanism 106. The electronics section 108 also includes one or more electrical components (not shown) that are associated with one or more of the base portion 112 and the side portion 118. The electrical components, e.g., printed circuit boards, wires, cables, etc., are configured to electrically couple one or more electrical contacts associated with the battery compartment to one or more electrical contacts associated with the connector mechanism 106.

Figure 6A:
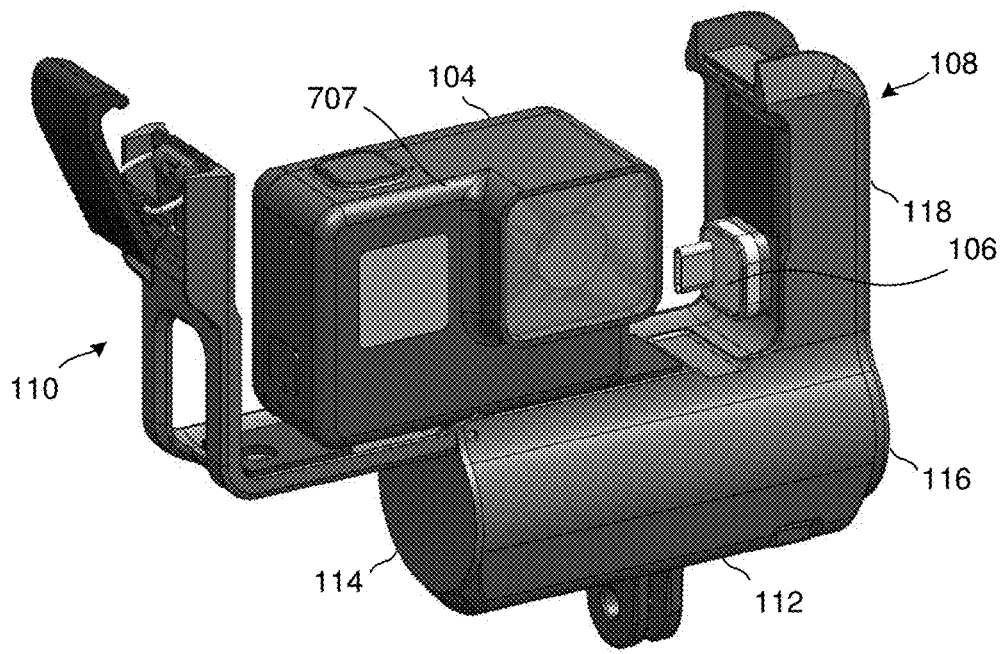
FIG. 6A and FIG. 6B are front perspective illustrations of the battery pack of FIG. 2 in an open state, with a portable electronic device shown at different stages of installment.
Figure 6B:
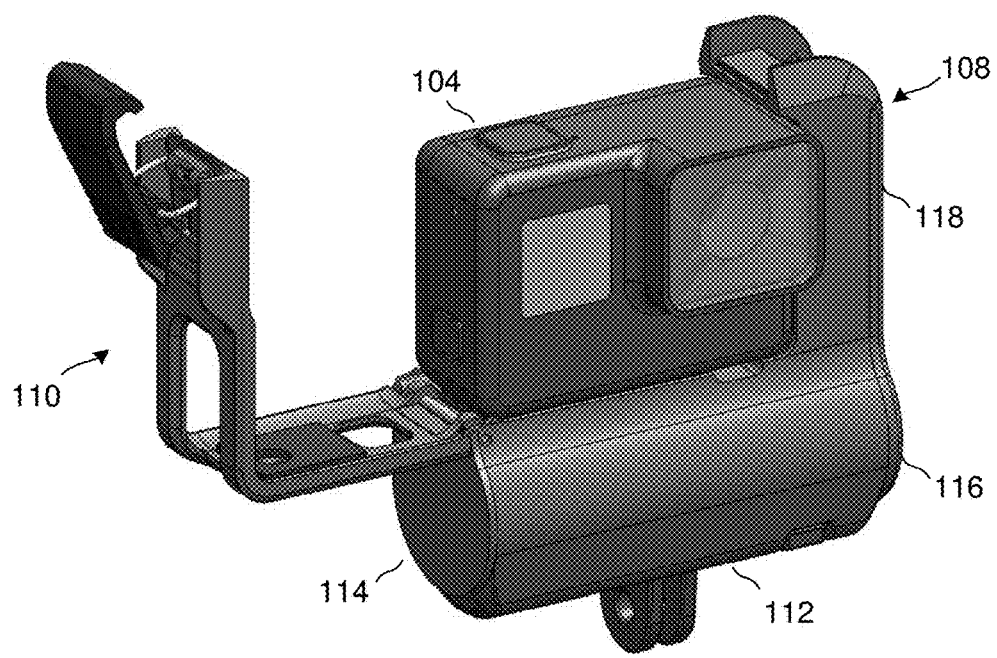

FIG. 6A is a front perspective illustration of the battery pack 102 in an open state, with a portable electronic device 104 placed partially on a surface of the electronics section 108 and partially on a surface of the latch section 110. The portable electronic device 104 includes a side (not visible) facing the connector mechanism 106, that includes a connector with which the connector mechanism 106 of the battery pack 102 is configured to mate. The connector of the portable electronic device may be a power connector. FIG. 6B is a front perspective illustration of the battery pack 102 in an open state, with a portable electronic device 104 placed entirely on a surface of the latch section 110 and mated with the connector mechanism (not visible) of the latch section. Mating or interconnection of the portable electronic device 104 with the battery pack 102 may be achieved by sliding the portable electronic device along a track formed by the base portion 112 of the first frame section 108 and a portion of the second frame section 110.

Figure 7:
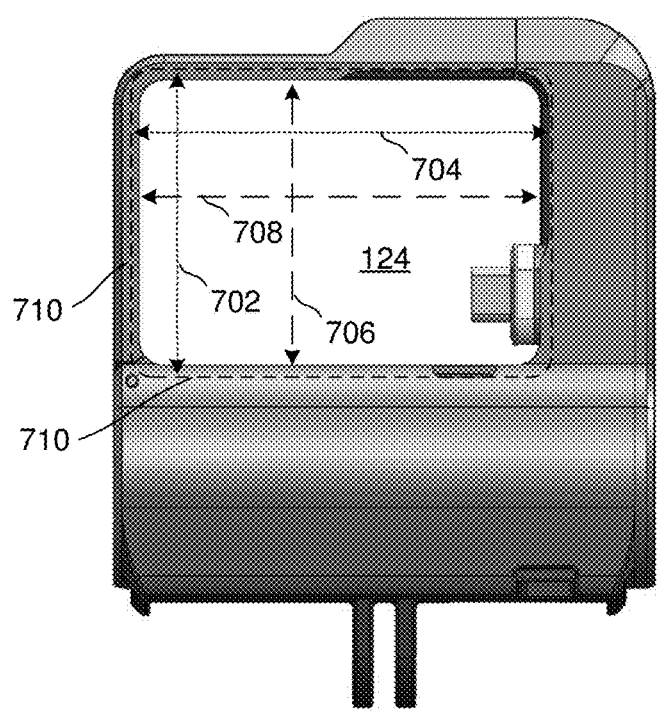
FIG. 7 is a front view of the battery pack of FIG. 2 in a closed state.

Referring to FIGS. 2, 4, and 5-7, the latch section 110 is configured to pivot relative to the electronics section 108 to thereby transition the battery pack 102 between a closed state (as shown in FIG. 2, FIG. 4 and FIG. 7) and an open state (as shown in FIGS. 5, 6A and 6B). In the open state, the frame structure formed by the electronics section 108 and the latch section 110 assumes an open U shape that allows for easy placement of the portable electronic device 104 within the battery pack and interconnection therewith.

With reference to FIGS. 2 and 5, the latch section 110 includes a clamp 138 that engages a clamp receiving structure 140 of the electronics section 108 when the latch section is pivoted to transition the battery pack to a closed state. The clamp 138 secures to the clamp receiving structure 140 to lock the battery pack 102 in the closed state. As shown in FIG. 2, when in the closed state, the battery pack 102 forms a closed frame structure having a front 120, a rear 122, and an opening 124 extending between the front and the rear.

Referring to FIG. 2 and FIG. 7, the opening 124 of the closed frame structure may be generally characterized by three dimensions—height, width and depth. As shown in FIG. 7, the opening 124 has a maximum height 702 and a maximum width 704. The maximum height 702 and the maximum width 704 of the opening 124 are defined by opposing planar surfaces 710 of the electronics section 108 and the latch section 110. The opening 124 also has a maximum depth 703 that is visible in FIG. 2. The maximum depth 703 is defined by one or more rim portions 130 of the electronics section 108 and the latch section 110 that extend away from the planar surfaces 710 of the electronics section and the latch section.

The maximum height 702, maximum width 704 and maximum depth 703 of the opening 124 are greater than the maximum height, maximum width and maximum depth of the portable electronic device to be installed in the battery pack. The amount by which the maximum dimensions of the opening 124 are greater than the maximum dimensions of the portable electronic device is generally small, on the order of a millimeter, which allows for a tight fit between the portable electronic device and the closed frame structure that prevents or significantly restricts side-to-side, up-and-down, and back-and-forth movement of the device within the closed frame structure.

The opening 124 may also be characterized by a minimum height 706 and a minimum width 708 that are less than the maximum height and the maximum width of the portable electronic device. As best shown in FIGS. 5 and 7, the minimum height 706 and the minimum width 708 of the opening are defined by one or more rim portions 130 of the electronics section 108 and the latch section 110 that extend away from the planar surfaces of the electronics section and the latch section. The amount by which the minimum dimensions 706, 708 of the opening 124 are less than the maximum dimensions of the portable electronic device is generally in the range of 3-6 millimeters. The edges of the rim portions 130 thus form a frame around all or most of the opening 124 that prevents or significantly restricts back-and-forth movement of the portable electronic device within the closed frame structure.

With reference to FIGS. 2, 4 and 6A, the rim portions 130 of the electronics section 108 and the latch section 110 of the battery pack 102 are characterized by concave contours 705 configured to abut convex contours 707 of the edges of the portable electronic device 104. Given this characteristic of the close frame structure, and the above described dimensions of the opening 124 of the closed frame structure relative to the portable electronic device, the battery pack 102 may be described as having an interior form factor, as defined by the opening 124, like the exterior form factor of the portable electronic device 104.

The battery pack 102 thus disclosed in FIGS. 1-7 includes an electronics section 108 and a latch section 110. The electronics section 108 includes a battery compartment configured to hold one or more batteries and a connector mechanism 106 configured to interconnect with and form a waterproof seal around a device connector of a portable electronic device 104. The latch section 110 is pivotably coupled to the electronic section 108 and configured to pivot relative to the electronic section to transition the battery pack 102 between open and closed states. In the open state (FIG. 5), the electronics section 108 and the latch section 110 form an open frame structure configured to enable installation of the portable electronic device 104 in the battery pack. In the closed state (FIG. 2), the electronics section 108 and the latch section 110 form a closed frame structure configured to secure the portable electronic device 104 within an opening 124 defined by the closed frame structure.

In the configuration of FIGS. 1-7, the electronics section 108 includes a base portion 112 that includes the battery compartment, and a side portion 118 that includes the connector mechanism 106. The side portion 118 extends in a generally orthogonal direction from the base portion 112 and the connector mechanism 106 extends in a general orthogonal direction from the side portion in the direction of the opening 124 formed by the closed frame structure. Due to the positioning of the connector mechanism 106 on the interior side of the battery pack 102, interconnection between the connector mechanism and the device connector may occur only during installation of the portable electronic device in the battery pack. Once the battery pack 102 is closed, the interconnection between the connector mechanism and the device connector is inaccessible and the interconnection remains locked in place until the battery pack is opened.

Figure 8:
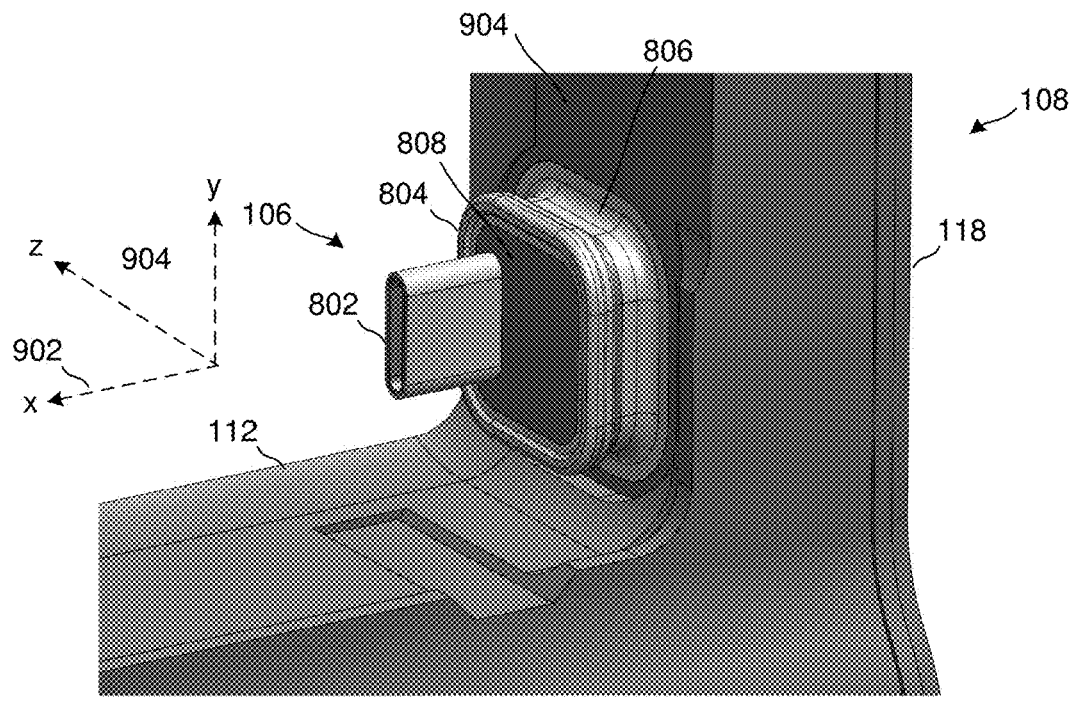
FIGS. 8-13 are various illustrations of a first embodiment of the connector mechanism of the battery pack of FIG. 2.
Figure 9:
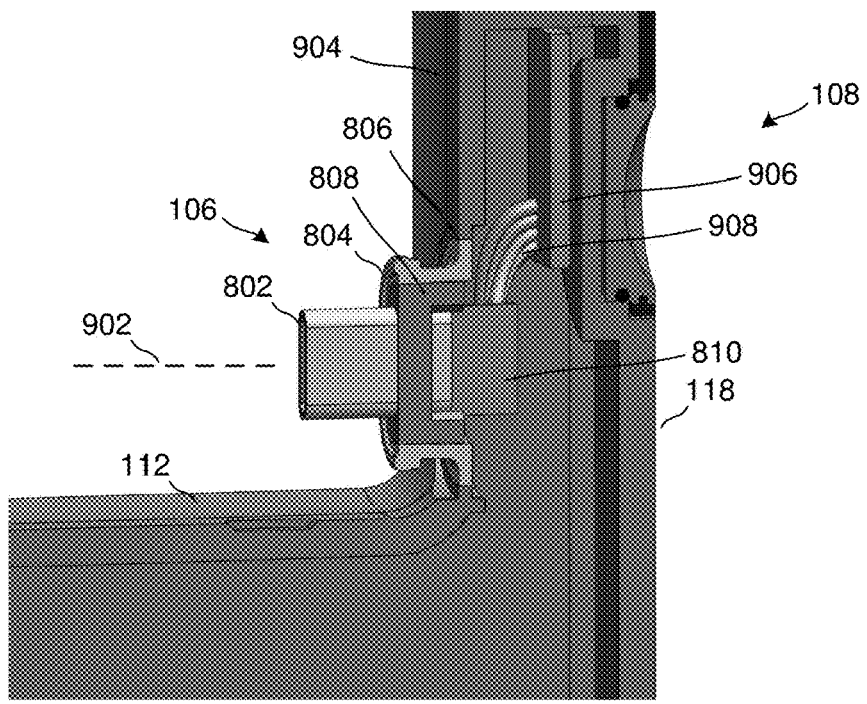
Figure 10:
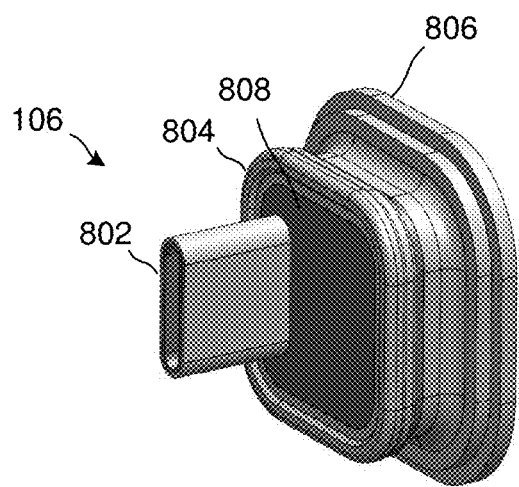
Figure 11:
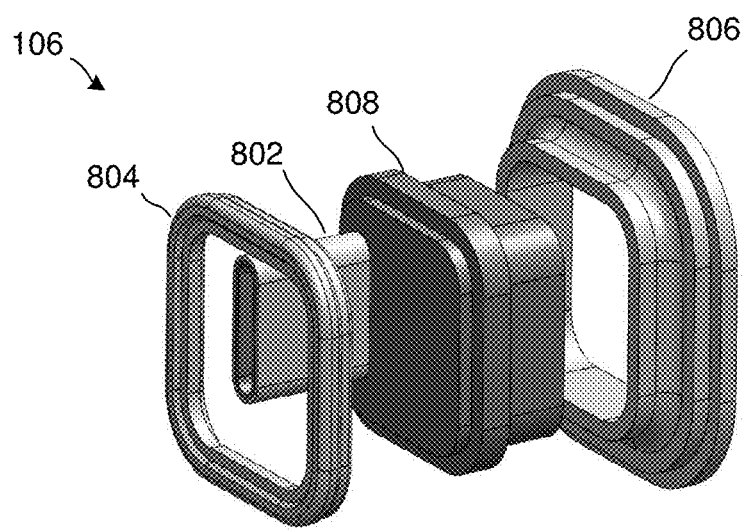

FIG. 8 is a perspective illustration of a first embodiment of the connector mechanism 106 of the electronics section 108. FIG. 9 is a cross section perspective illustration of FIG. 8. FIG. 10 is a perspective illustration of the first embodiment of the connector mechanism. FIG. 11 is an exploded perspective illustration of the first embodiment of the connector mechanism.

The connector mechanism 106 includes a connector 802, e.g., a C-type USB connector, a seal 804, a flexible mount 806, a holder 808, and a printed circuit board 810. The connector 802 is configured to mate and interconnect with a corresponding connector receptacle of the portable electronic device 104 and is electrically and mechanically coupled to the printed circuit board 810. The seal 804 is formed of a thermoplastic polyurethane (TPU) and is dimensioned and configured to fit within a recessed well of the portable electronic device 104 that surrounds the connector receptacle, and to form a water tight seal along the perimeter of the recessed well. The flexible mount 806 is also formed of TPU and may be configured to allow for the other components of the connector mechanism 106 to flex or articulate relative to the electronics section 108. Each of the seal 804 and flexible mount 806 are secured to an outer surface of the holder 808. The seal 804 forms a plug that surrounds the connector 802.

Each of the connector 802 and printed circuit board 810 extend at least partially through a hole in the holder 808. The holder 808 is formed of a rigid plastic and secures the connector 802 in place relative to the seal 804 and flexible mount 806. The back surface of the flexible mount 806 is bonded to the electronics section 108, which is formed of rigid plastic. The printed circuit board 810 of the connector mechanism 106 is electrically connected to a printed circuit board 906 of the electronics section 108 through a flexible ribbon cable 908. Enough slack may be present in the ribbon cable to allow for the printed circuit board 810 of the connector mechanism 106 to move relative to the printed circuit board 906 of the electronics section 108.

The connector mechanism 106 has a central axis 902 that extends along the length of the connector. In FIG. 8 and FIG. 9, the connector mechanism 106 is in an unarticulated position during which the central axis 902 is substantially perpendicular with respect to a planar surface 904 of the electronics section 108, or orthogonal to the planar surface. For description purposes, the central axis 902 is shown in FIG. 8 as corresponding to an x axis of a three-dimensional coordinate system, while the planar surface 904 is shown as corresponding to a plane defined by the y axis and the z axis.

Figure 12:
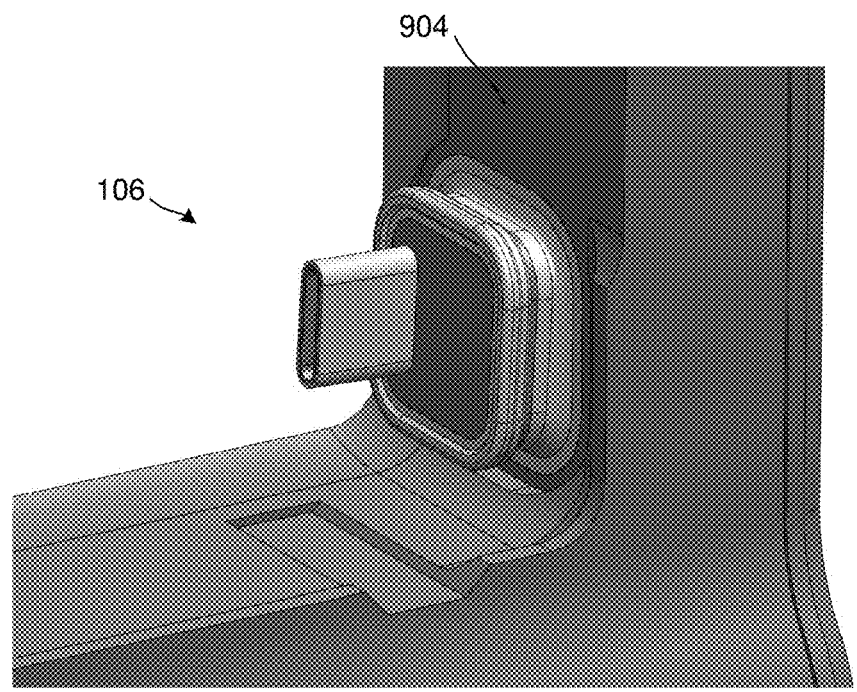
Figure 13:
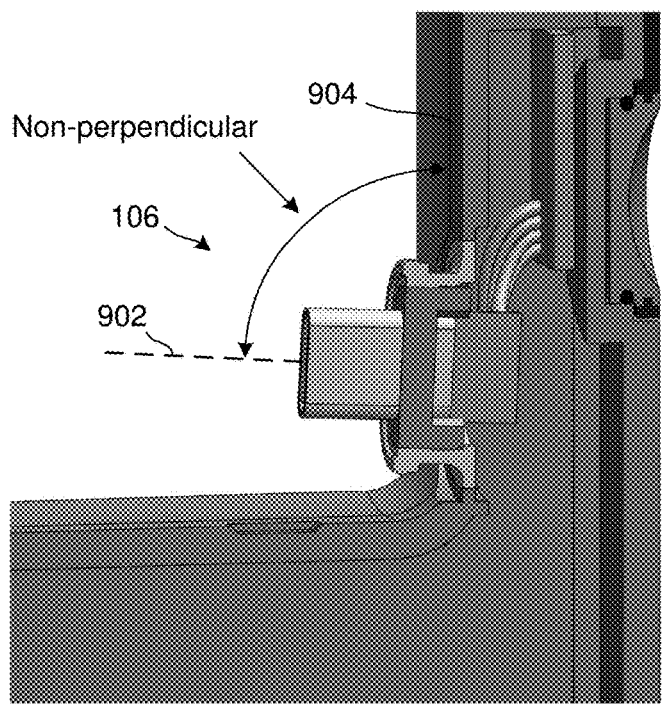

FIG. 12 is a perspective illustration of a first embodiment of the connector mechanism 106 of the electronics section 108 in an articulated position. In an articulated position, the central axis 902 of the connector mechanism 106 is non-perpendicular with respect to the planar surface 904 of the electronics section. With reference to the three-dimensional coordinate system shown in FIG. 8, the connector mechanism 106 may be configured so that the central axis 902 of the connector articulates in only one direction, e.g., up and down, or side-to-side, relative to the planar surface 904, or in either of two directions, e.g., up and down, and side-to-side, relative to the planar surface, or simultaneously in two directions such that the end portion of the connector articulates about the central axis 902. FIG. 13 is a cross section perspective illustration of FIG. 12.

A connector mechanism 106 configured to articulate as thus described is beneficial in that it reduces the possibility of damage to either of the electronic-device connector and the battery-pack connector during installation of the portable electronic device 104 or during use of the device. For example, during installation, while the portable electronic device 104 is being slid into place, the connector of the device may not perfectly align with the connector of the battery pack. As the electronic-device connector engages the battery-pack connector, misalignment of the respective connectors may be compensated for by the flexibility of the battery pack connector, which flexibility allows the connector to articulate into alignment with the electronic-device connector. Likewise, after the portable electronic device 104 is installed in the battery pack, the electronic device and the battery pack may experience sudden movement that may cause the device body to slightly shift within the battery-pack frame. The flexibility of the battery-pack connector allows for the battery-pack connector to move relative to the battery-pack frame and maintain alignment with the electronic-device connector; thereby reducing the possibility of damage that would otherwise occur if the battery-pack connector was rigidly fixed in place within the battery-pack frame. Furthermore, the flexible mount 806 itself is configured to reduce stress on the battery-pack connector during shocks that may occur during ordinary use of the battery pack, including for example, from dropping of the battery pack or high-G movements of the battery pack.

Figure 14:
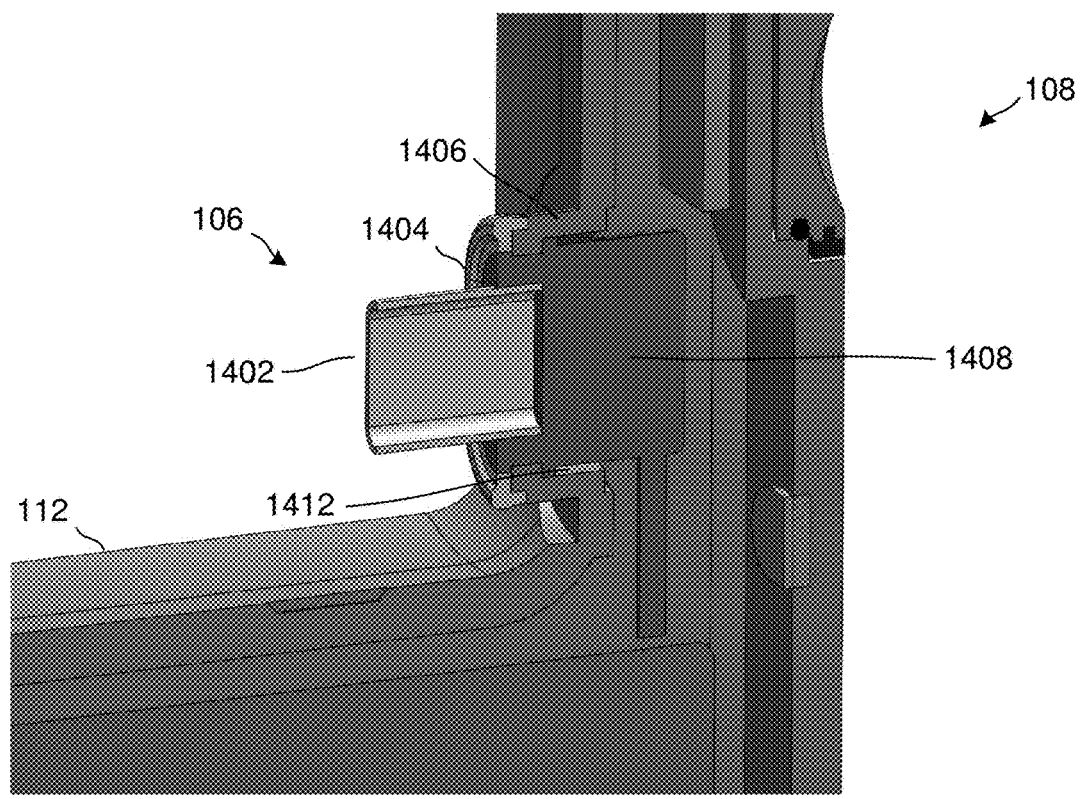
FIGS. 14 and 15 are illustrations of a second embodiment of a connector mechanism of a battery pack.
Figure 15:
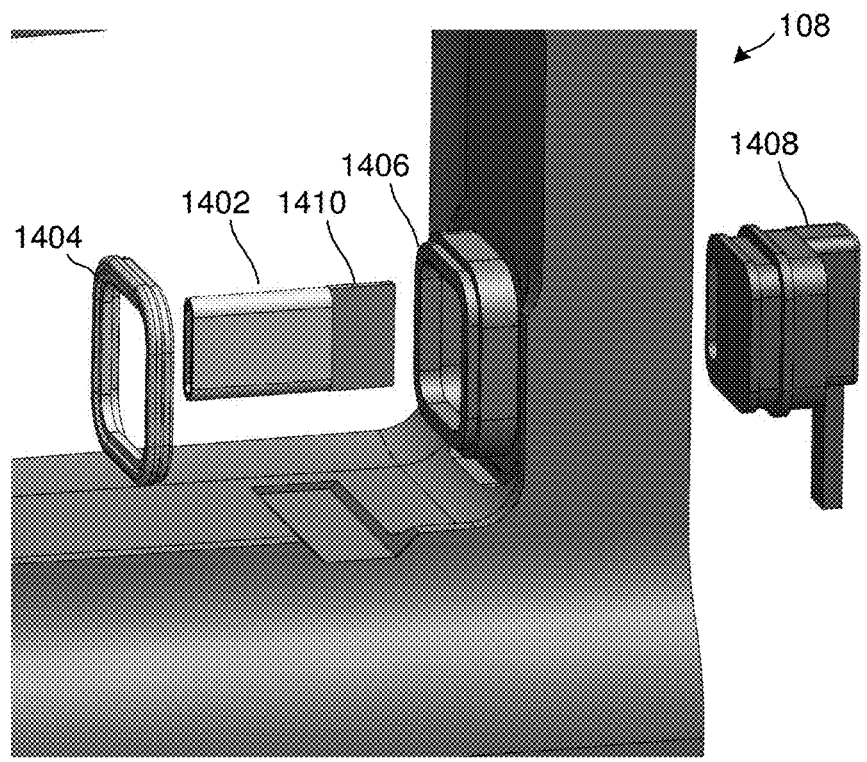

FIG. 14 is a cross section perspective illustration of a second embodiment of the connector mechanism 106 of the electronics section 108. FIG. 15 is an exploded perspective illustration of the second embodiment of the connector mechanism. The connector mechanism 106 includes a connector 1402, e.g., a C-type USB connector, a seal 1404, a semi-rigid overmold 1408, and a printed circuit board 1410. The connector 1402 is configured to mate or interconnect with a corresponding connector receptacle of the portable electronic device 104 and is electrically and mechanically coupled to the printed circuit board 1410. The seal 1404 is formed of a thermoplastic polyurethane (TPU) and is dimensioned and configured to fit within a recessed well of the portable electronic device 104 that surrounds the connector receptacle, and to form a water tight seal along the perimeter of the recessed well.

Each of the connector 1402 and printed circuit board 1410 extend at least partially through a hole in the semi-rigid overmold 1408. The semi-rigid overmold 1408 is formed of a rigid plastic and secures the connector 1402 in place relative to the seal 1404. The semi-rigid overmold 1408 includes electrical components, e.g., wires, cables, etc., that electrically connect with the printed circuit board 1410 at one end and with electrical components of the battery compartment at the other end. The back surface of the seal 1404 is bonded to a protrusion 1406 that is molded into the electronics section 108. The semi-rigid overmold 1408 fits into the protrusion 1406. A gap 1412 between the inner wall of the protrusion 1406 and the outer surface of the semi-rigid overmold 1408 may be included to allow for the semi-rigid overmold 1408 and other components of the connector mechanism to articulate relative to the electronics section 108 in the same manner as described above with reference to the first embodiment of the connector mechanism.

Figure 16:
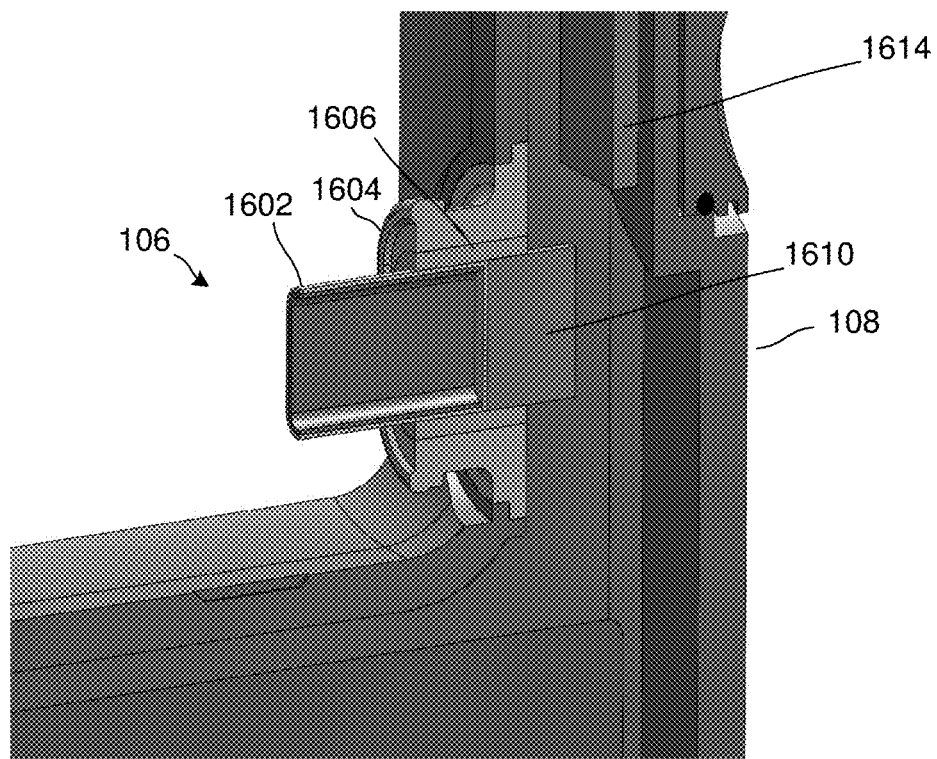
FIGS. 16 and 17 are illustrations of a third embodiment of a connector mechanism of a battery pack.
Figure 17:
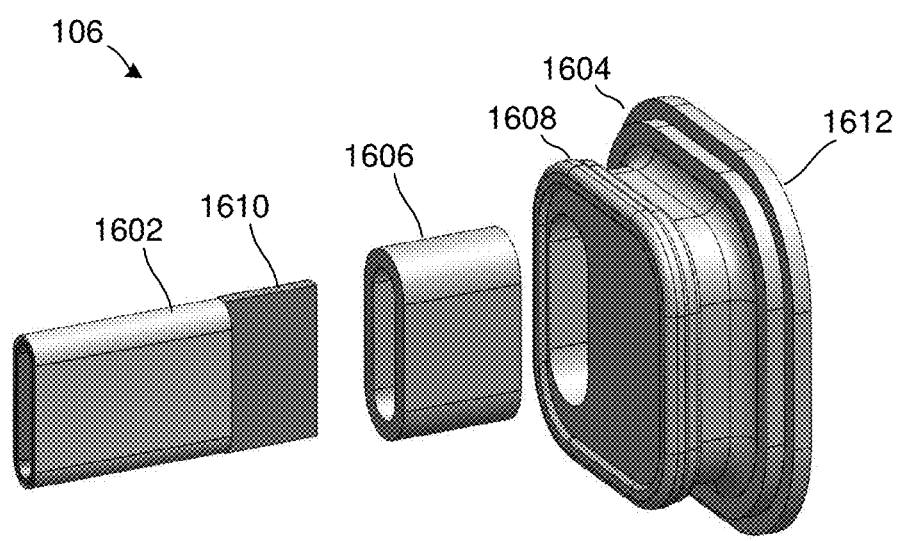

FIG. 16 is a cross section perspective illustration of a third embodiment of the connector mechanism 106 of the electronics section 108 FIG. 17 is an exploded perspective illustration of the third embodiment of the connector mechanism. The connector mechanism 106 includes a connector 1602, e.g., a C-type USB connector, a flexible single-piece seal/boot 1604, a connector sleeve 1606, and a printed circuit board 1610. The connector 1602 is configured to mate or interconnect with a corresponding connector receptacle of the portable electronic device 104 and is electrically and mechanically coupled to the printed circuit board 1610. The seal/boot 1604 is formed of a thermoplastic polyurethane (TPU) and is dimensioned and configured at a first end 1608 to fit within a recessed well of the portable electronic device 104 that surrounds the connector receptacle of the portable electronic device 104, and to form a water tight seal along the perimeter of the recessed well. The seal/boot 1604 is bonded to the electronics section 108 at a second end 1612. The seal/boot 1604 may also be configured to allow for the other components of the connector mechanism to flex or articulate relative to the electronics section 108 in the same manner as described above with reference to the first embodiment of the connector mechanism.

Each of the connector 1602 and printed circuit board 1610 extend at least partially through the connector sleeve 1606 which extends through a hole in the seal/boot 1604. The connector sleeve 1606 is formed of a rigid plastic and secures the connector 1602 in place relative to the seal/boot 1604.

Figure 18:
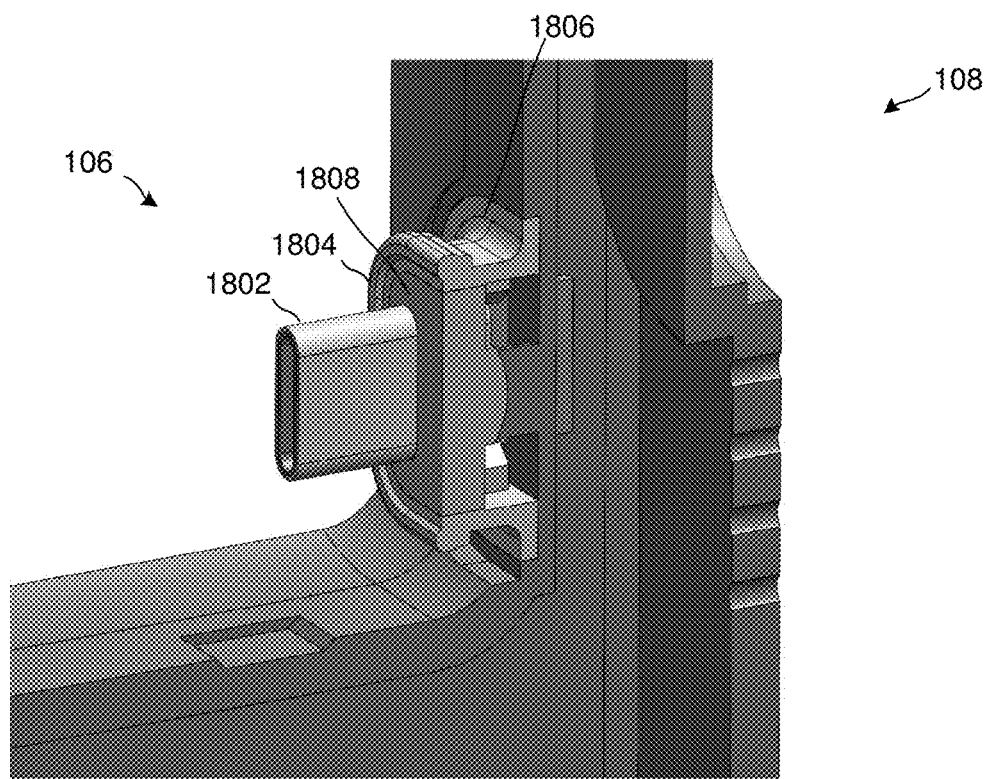
FIGS. 18-23 are various illustrations of a fourth embodiment of a connector mechanism of a battery pack.
Figure 19:
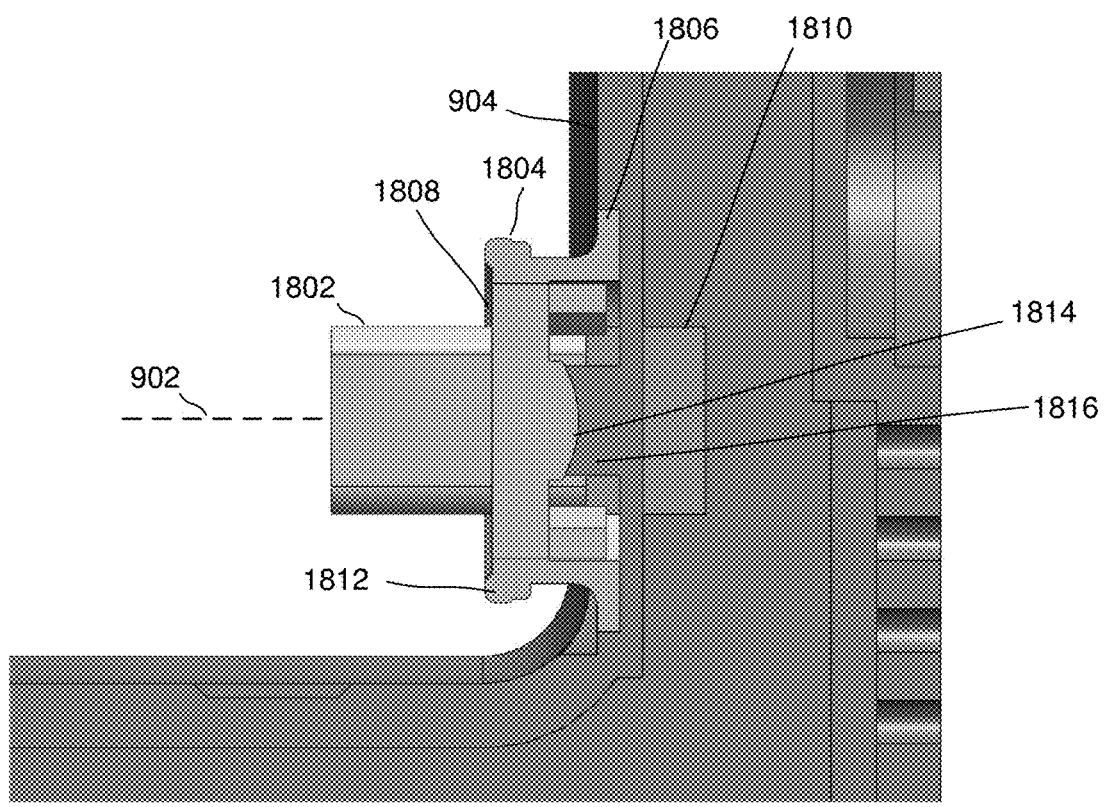
Figure 20:
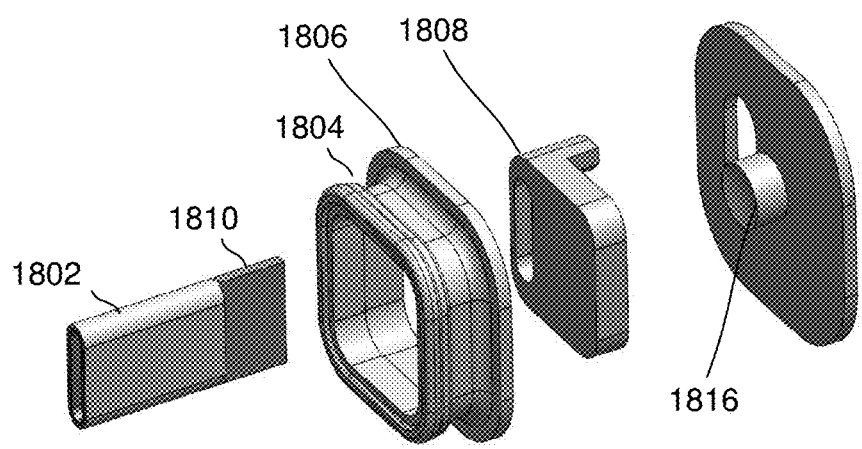
Figure 21:
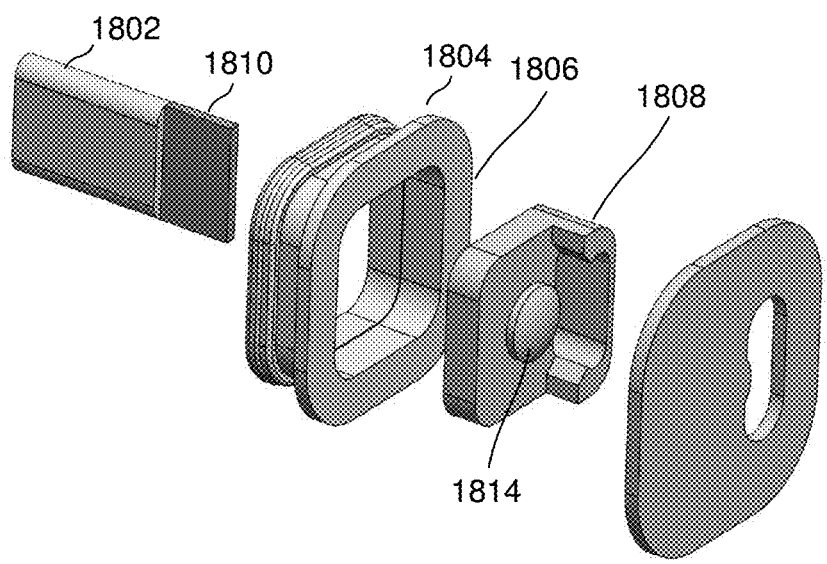

FIG. 18 is a perspective illustration of a fourth embodiment of the connector mechanism 106 of the electronics section 108. FIG. 19 is a cross section perspective illustration of FIG. 18. FIG. 20 is an exploded perspective illustration of the fourth embodiment of the connector from a first direction. FIG. 21 is an exploded perspective illustration of the fourth embodiment of the connector from a second direction.

The connector mechanism 106 includes a connector 1802, e.g., a C-type USB connector, a flexible single-piece seal/boot 1804, a holder 1808, and a printed circuit board 1810. The connector 1802 is configured to mate or interconnect with a corresponding connector receptacle of the portable electronic device 104 and is electrically and mechanically coupled to the printed circuit board 1810. The seal/boot 1804 is formed of a thermoplastic polyurethane (TPU) and is dimensioned and configured at a first end 1812 to fit within a recessed well of the portable electronic device 104 that surrounds the connector receptacle of the portable electronic device 104, and to form a water tight seal along the perimeter of the recessed well. The seal/boot 1804 is secured, e.g., bonded, to the electronics section 108 at a second end 1806. The seal/boot 1804 may also be configured to allow for the other components of the connector mechanism 106 to flex or articulate relative to the electronics section 108 in the same manner as described above with reference to the first embodiment of the connector mechanism.

The connector 1802 and printed circuit board 1810 extend at least partially through the holder 1808. The printed circuit board 1810 extends into the electronics section 108 where it is electrically coupled to a printed circuit board (not shown) by a flexible ribbon cable (not shown). The holder 1808 is formed of a rigid plastic and secures the connector 1802 and printed circuit board 1810 in place relative to the seal/boot 1804. The holder 1808 includes a pivot structure 1814 that is configured to engage a pivot structure 1816 of the electronics section 108. In the configuration shown in FIGS. 18-23, the pivot structure 1814 of the holder 1808 is a convex spherical protrusion and the pivot structure 1816 of the electronics section 108 is a corresponding concave spherical recess. The pivot structure 1816 of the electronics section 108 is fixed in place, while the holder 1808 and its pivot structure 1814 are movable. Accordingly, the holder 1808 may move or articulate about the pivot structure 1816 of the electronics section 108.

Figure 22:
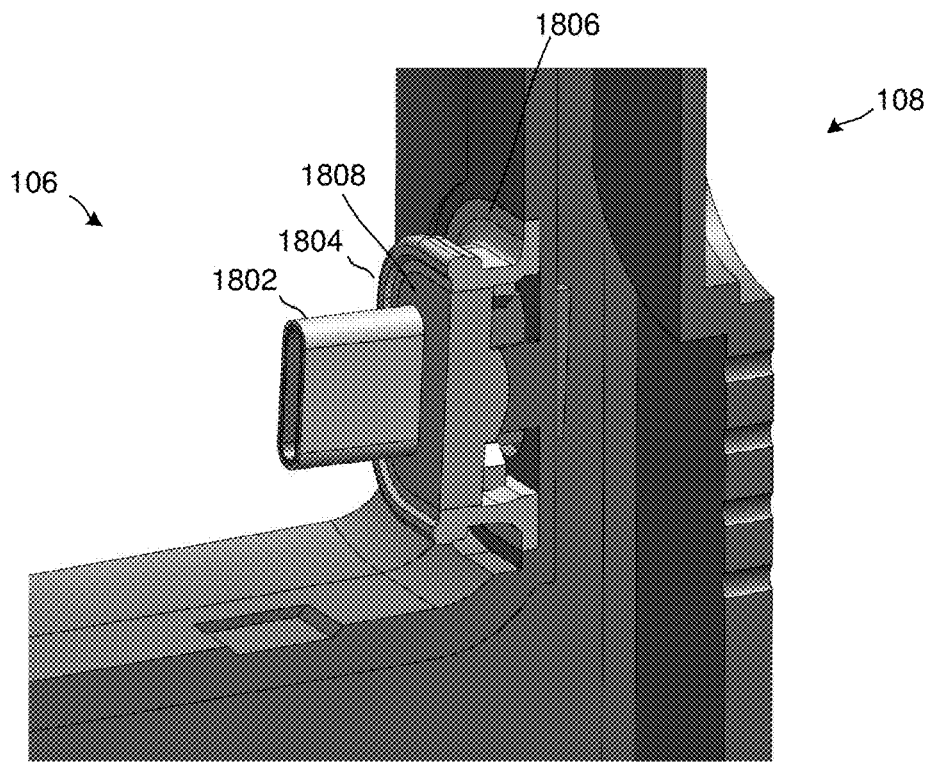
Figure 23:
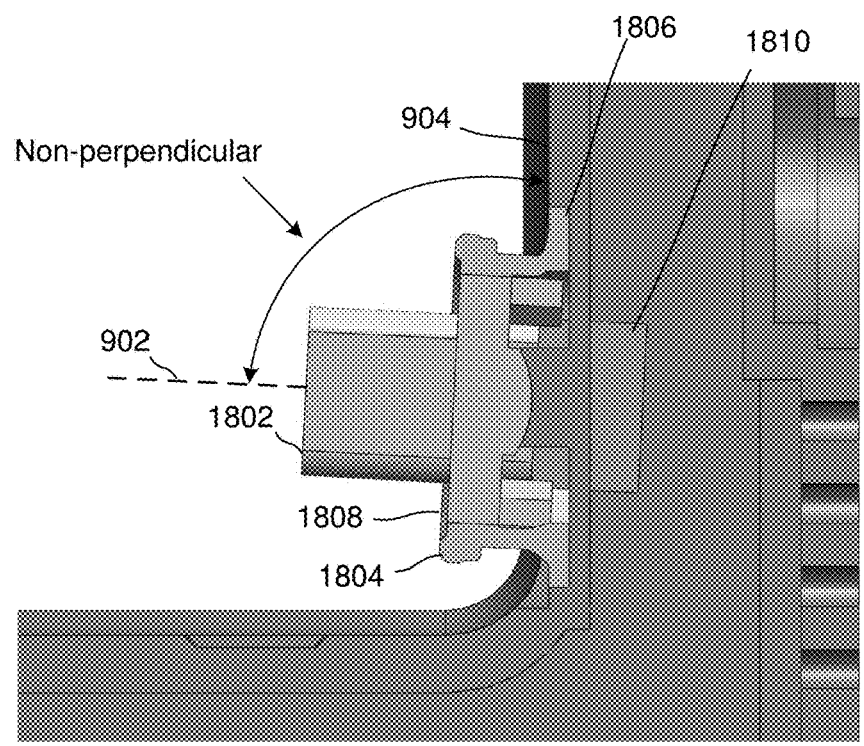

The connector mechanism 106 has a central axis 902 that extends along the length of the connector. In FIG. 18 and FIG. 19, the connector mechanism 106 is in an unarticulated position during which the central axis 902 is substantially perpendicular with respect to a planar surface 904 of the electronics section. FIG. 22 is a perspective illustration of the fourth embodiment of the connector mechanism 106 of the electronics section 108 in an articulated position. In an articulated position, the central axis 902 of the connector mechanism 106 is non-perpendicular with respect to the planar surface 904 of the electronics section. FIG. 23 is a cross section perspective illustration of FIG. 22.

Figure 24:
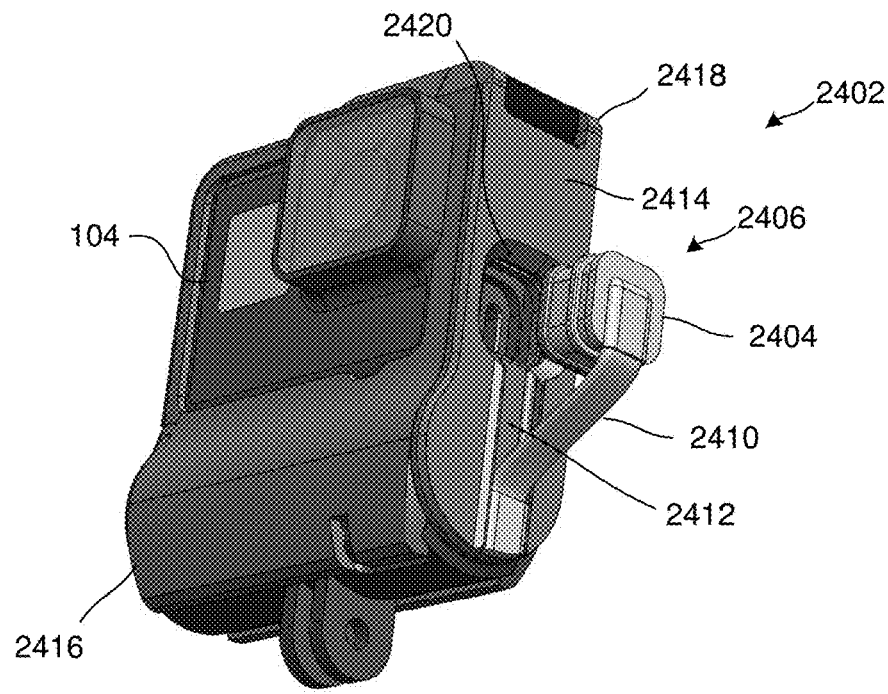
FIG. 24 is a front and bottom perspective illustration of another configuration of a battery pack having a connector mechanism located at the exterior of the pack.
Figure 25:
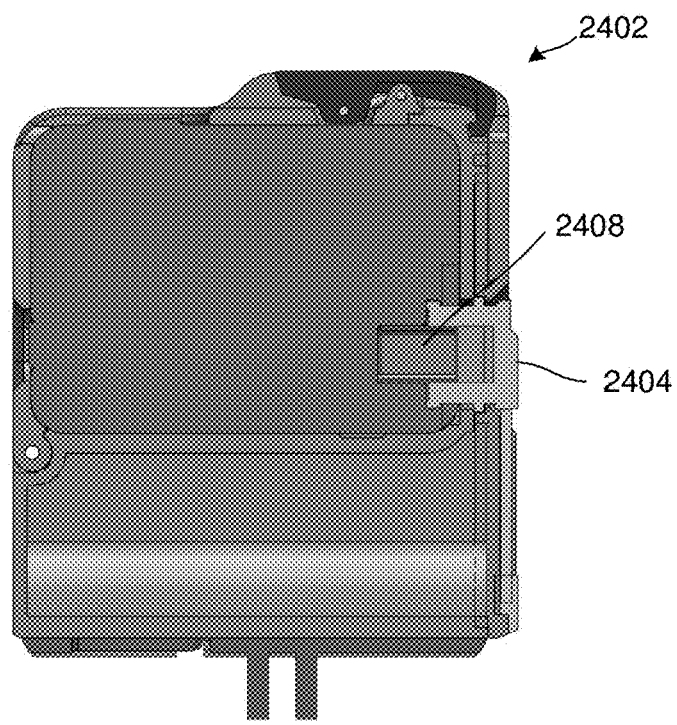
FIG. 25 is a cross section illustration of the battery pack of FIG. 24.

FIG. 24 is a front and top perspective view of another configuration of a battery pack 2402 wherein a connector mechanism 2404 is located exterior to the pack and is included in a dongle 2406. FIG. 25 is a plan view of the battery pack 2402, with partial cross section showing the connector 2408 of the portable electronic device 104 engaging the connector mechanism 2404. The dongle 2406 includes the connector mechanism 2404 and a cable 2410. The cable 2410 is sized to fit within a channel 2412 formed in the electronics section 2414 of the battery pack 2402 such that the cable may be removed from the channel and inserted into the channel. With reference to FIG. 24, in this configuration, the connector mechanism 2404 may be disengaged with the device connector 2408 of the portable electronic device 104 and removed from the latch section together with the cable 2410 to allow for access to the electronic-device connector by another device.

In this configuration, the electronics section 2414 includes a base portion 2416 that includes the battery compartment, and a side portion 2418 that includes a port 2420 extending therethrough and a flexible cable 2410 that is coupled to the connector mechanism 2404. The side portion 2418 extends in a generally orthogonal direction from the base portion 2416. The connector mechanism 2404 and port 2420 are configured to allow for insertion and removal of the connector mechanism relative to the port. In this configuration, while the connector mechanism 2404 is positioned on the exterior of the battery pack 2402, the port 2420 provides the connector mechanism access to the interior side of the pack. Accordingly, interconnection between the connector mechanism 2404 and the device connector 2408 is enabled either during or after installation of the portable electronic device 104 in the battery pack.

Figure 27:
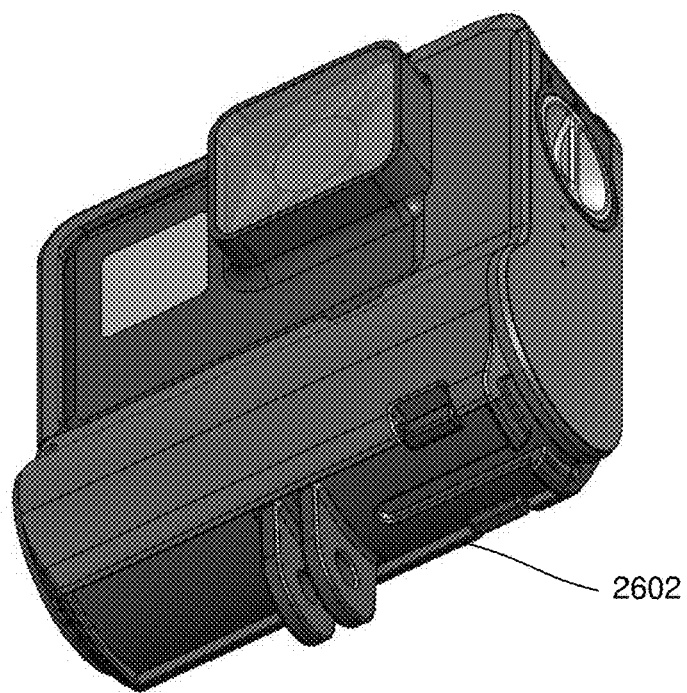
FIG. 27 is a front and bottom perspective illustration of the battery pack of FIG. 26, with one of the two interchangeable mounts installed.
Figure 28:
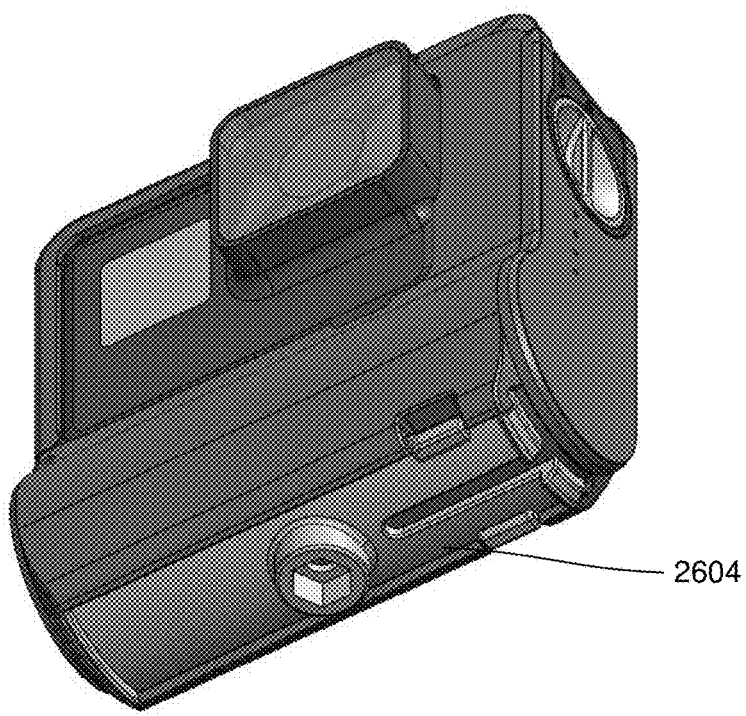
FIG. 28 is a front and bottom perspective illustration of the battery pack of FIG. 26, with the other of the two interchangeable mounts installed.

FIG. 26 is a front, bottom perspective view of the battery pack 102, with two interchangeable mounts 2602, 2604 uninstalled. The first interchangeable mount 2602 is configured to be mounted to an angular adjusting structure. The second interchangeable mount 2604 is configured to be mounted to a standard camera tripod. FIG. 27 is a front, bottom perspective view of the battery pack 102 of FIG. 26, with a first mount 2602 of the two interchangeable mounts installed. FIG. 28 is a front, bottom perspective view of the battery pack 102 of FIG. 26, with a second mount 2604 of the two interchangeable mounts installed.

Each of the interchangeable mounts is configured the same, except for the mount structure. The mounts 2602, 2604 are dimensioned to fit within a track 2616 located at the bottom of the portable electronic device 104 104. The mounts include a longitudinal cut out 2608 at one end that forms two opposing arms 2618a, 2618b. Associated with each arm 2618a, 2618b is a grip protrusion 2606a, 2606b and a first end stop 2612a, 2612b. A second end stop 2610 is at the opposite end of the mount.

A mount 2602, 2604 is installed by sliding the second end stop 2610 into the track 2616 at a first end 2620 of the track until the grip protrusion 2606a, 2606b abut the edges 2622a, 2622b of the track 2616, which thereby prevents further sliding of the mount. The opposing grip protrusions 2606a, 2606b may then be squeezed towards each other, which in turn causes the opposing arms 2618a, 2618b to move towards each other. This squeezing displaces the grip protrusions 2606a, 2606b inward relative to the edges 2622a, 2622b of the track 2616 and toward the middle of the track where the protrusions no longer abut the edges. As such, the mount 2602, 2604 may slide further along the track 2616 until the grip protrusions 2606a, 2606b align with corresponding notches 2614a, 2614b of the track 2616. Upon such alignment, the grip protrusions 2606a, 2606b snap into place in the notches 2614a, 2614b thereby securing the mount 2602, 2604 to the battery pack 102. The mount 2602, 2604 may be removed by squeezing the grip protrusions 2606a, 2606b toward each other and sliding the mount out along the track 2616.

Figure 29:
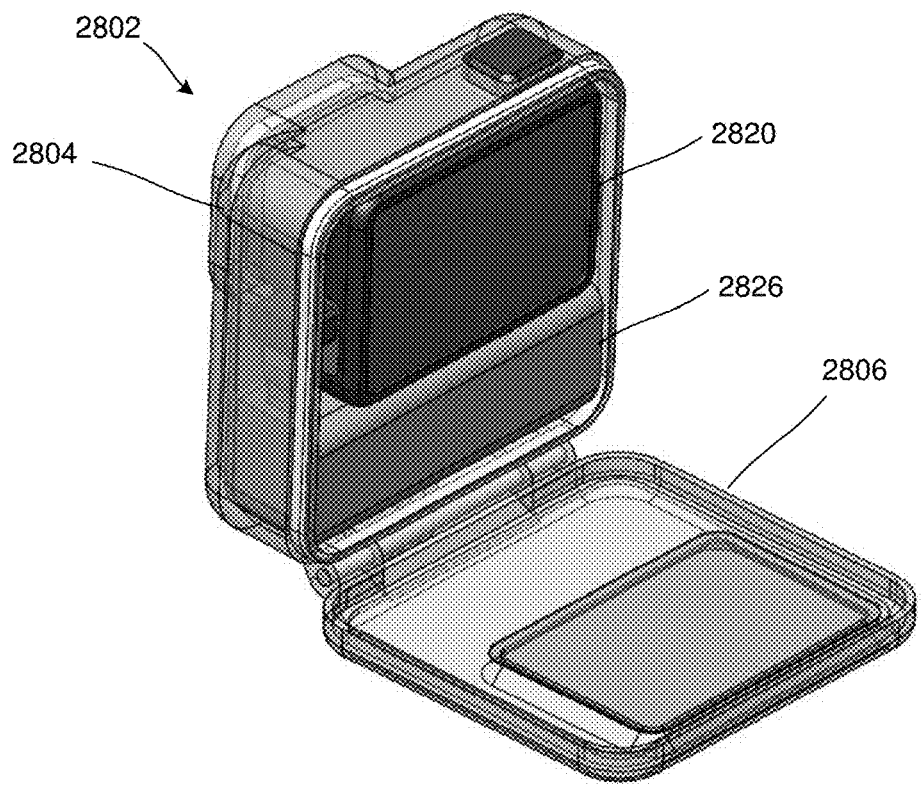
FIG. 29 is a rear perspective illustration of a battery pack showing a portable electronic device installed in the battery pack, with the battery pack opened.
Figure 30:
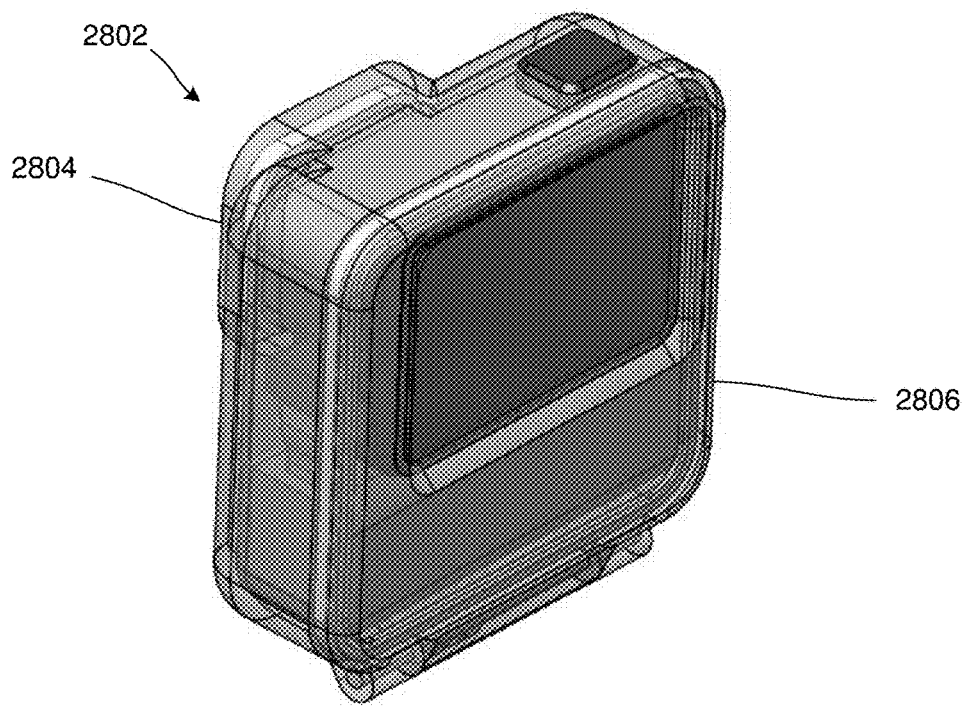
FIG. 30 is a rear perspective illustration of a battery pack showing a portable electronic device installed in the battery pack, with the battery pack closed.
Figure 31:
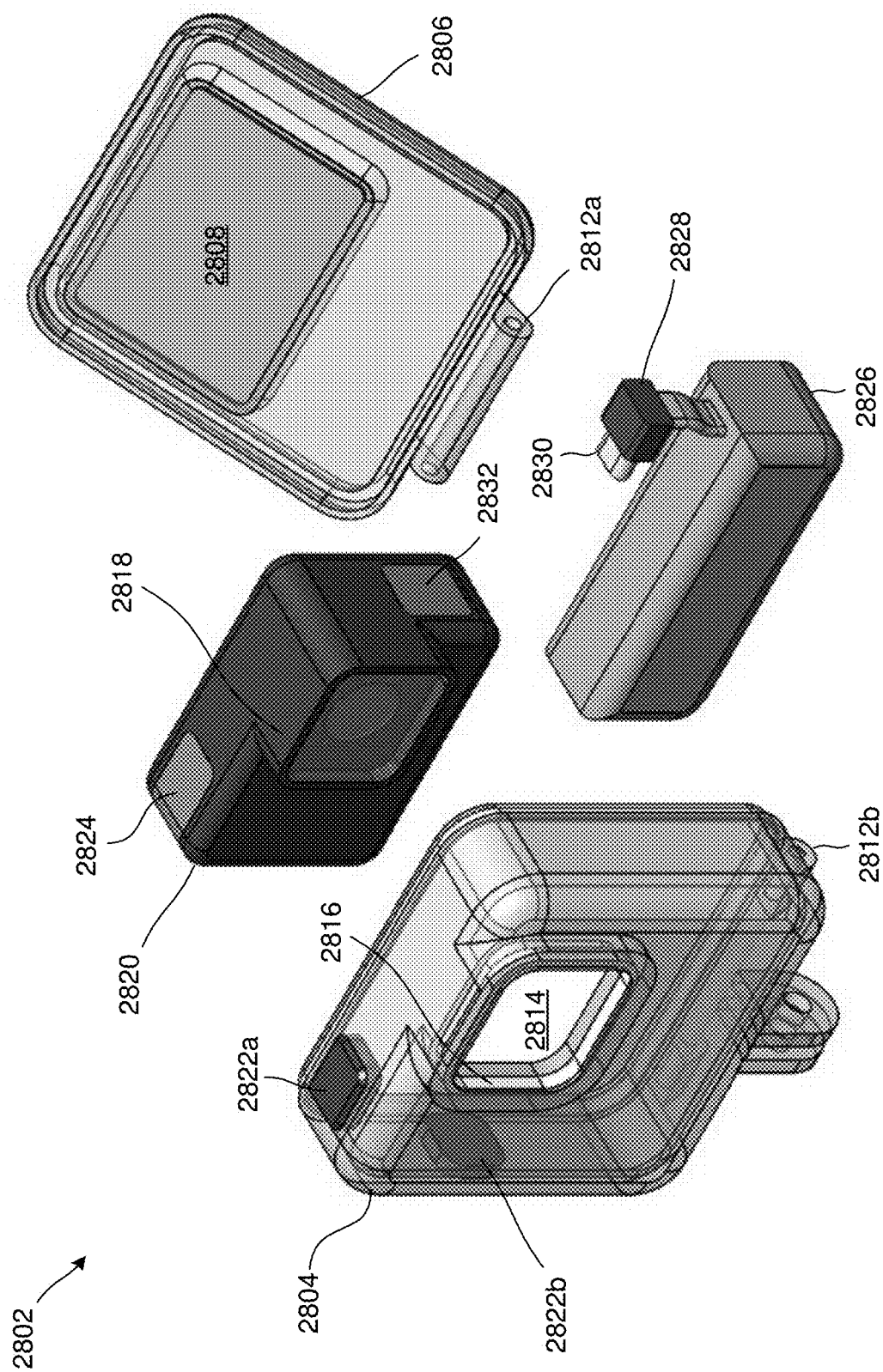
FIG. 31 is a front perspective illustration of the battery pack of FIG. 29 with the component parts separated.

FIGS. 29 and 30 are rear perspective illustrations of another configuration of a battery pack 2802 showing a portable electronic device 2820 installed in the battery pack, with the battery pack in an opened state (FIG. 29) and a closed state (FIG. 30). FIG. 31 is a front perspective illustration of the battery pack 2802 with the component parts separated. The battery pack 2802 includes a front case 2804 and a back case 2806, each having a perimeter gasket, which together provide a waterproof seal when the battery pack is in a closed state. The back case 2806 also includes a waterproof, sealed touchscreen film window 2808 through which a user may view and interface with the display of the portable electronic device 2820. The back case 2806 may be hinged to the front case 2804 through a snap-on hinge mechanism formed by respective features 2812a, 2812b of each case.

The front case 2804 includes a front opening 2814 with a perimeter gasket 2816. The opening 2814 is sized to receive a portion 2818 of the portable electronic device 2820 and sealingly engage with it to form a waterproof seal. For example, the opening 2814 may receive the lens portion 2818 of a camera. The front case 2804 also includes one or more membrane buttons 2822a, 2822b, each configured to provide a waterproof interface through which the user may interact with a corresponding operation button 2824a on the portable electronic device 2820.

The battery pack 2802 includes a battery unit 2826 having a dongle connector 2828 electrically coupled thereto. The dongle connector 2828 includes a connector 2830 configured to interconnect with a connector receptacle 2832 of the portable electronic device 2820. Upon connection of the battery unit 2826 to the portable electronic device 2820, the device rests on top of the battery unit and together, the unit and device may be securely placed within the front case 2804. To this end, the battery unit 2826 is sized and contoured to fit within the bottom region of the front case 2804 in a manner that prevents or significantly restricts side-to-side movement of the battery unit. To further assist in properly positioning and securing the battery unit 2826 in place within the front case 2804, the internal surfaces of the front case may include one or more alignment features, e.g., grooves or protrusions, that mate with or align with corresponding features of the battery unit.

The portable electronic device 2820 is secured in place in the upper portion of the front case 2804 through placement of the portion 2818 of the device in the opening 2814 of the front case, which prevents or significantly restricts side-to-side movement of the device. Closing of the back case 2806 relative to the front case 2804 causes respective perimeter gaskets of the cases to abut each other to provide a waterproof enclosure that encases the battery unit 2826 and the portable electronic device 2820. The internal dimensions of the enclosure, including for example, the distance between the inside surfaces of the front case 2804 and the back case 2806, form a tight fit with the portable electronic device 2820 and the battery unit 2826 that prevents or significantly restricts back-and-forth movement of the device and battery unit within the battery pack 2802.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f), unless the element is expressly recited using the phrase "means for" or, in the case of a method claim, the element is recited using the phrase "step for."

What is claimed is:

1. A battery pack for electrically coupling with and securing to a portable electronic device having a device connector and one or more user interface components, the battery pack comprising:
   an electronics section comprising a battery compartment configured to hold one or more batteries, and a connector mechanism configured to interconnect with and form a waterproof seal around the device connector at an interface of the connector mechanism and the device connector; and
   a latch section coupled to the electronics section and configured to pivot relative to the electronics section to transition the battery pack between:
   an open state during which the electronics section and the latch section together form a u-shaped open frame structure configured to enable installation of the portable electronic device in the battery pack,
   a closed state during which the electronics section and the latch section form a closed frame structure configured to secure the portable electronic device within an opening defined by the closed frame structure, wherein the electronics section comprises:
   a base portion that includes the battery compartment; and
   a side portion that includes the connector mechanism,
   wherein the side portion extends orthogonally from the base portion and the connector mechanism extends orthogonally from the side portion in a direction toward the opening to thereby enable interconnection between the connector mechanism and the device connector during installation of the portable electronic device.

2. The battery pack of claim 1, wherein the connector mechanism comprises:
   a connector configured to interconnect with the device connector; and
   a plug surrounding a portion of the connector,
   wherein the plug is configured to mate with and sealingly engage with a recessed well surrounding the device connector.

3. The battery pack of claim 2, wherein the plug is formed of a thermoplastic polyurethane (TPU) and is dimensioned and configured to fit within the recessed well of the portable electronic device.

4. The battery pack of claim 1, wherein the connector mechanism extends outward from a surface of the electronics section and is configured such that a connector of the connector mechanism is capable of articulating in at least one direction relative to the surface of the electronics section.

5. The battery pack of claim 1, wherein one or more of the electronics section and the latch section comprise a feature configured to provide direct access to the one or more user interface components of the portable electronic device when the battery pack is in a closed state.

6. The battery pack of claim 5, wherein the feature comprises an opening extending through one of the electronics section and the latch section.

7. The battery pack of claim 6, further comprising a cap configured to sealingly engage with the perimeter of the opening to thereby provide a waterproof seal around the opening.

8. The battery pack of claim 5, wherein the feature comprises a notch or channel formed in a surface of one of the electronics section and the latch section.

9. The battery pack of claim 1, wherein the opening defined by the closed frame structure has a maximum height, a maximum width, and a maximum depth greater than a maximum height, a maximum width, and a maximum depth of the portable electronic device, and a minimum height and a minimum width less than the maximum height and the maximum width of the portable electronic device.

10. The battery pack of claim 1, wherein the electronics section further comprises a track having one or more mechanical features, the track configured to allow for insertion and removal of an interchangeable mounting structure.

11. The battery pack of claim 10, wherein the one or more mechanical features comprise at least one notch configured to engage with at least one protrusion of the interchangeable mounting structure.

12. The battery pack of claim 10, wherein the track is disposed on a portion of both of the electronics portion and the latch portion.

13. The battery pack of claim 1, wherein the battery pack has a front and a rear, and wherein, in its closed state, the electronics section and the latch section, together, define an opening that extends from the front to the rear.

14. The battery pack of claim 1, wherein the electronics section includes a base portion and a side portion that extends orthogonally from the base portion, and
   the latch section includes a base portion and a side portion that extends orthogonally from the base portion;
   and wherein, in its closed state, each of the base portion and side portion of the electronics section, and the base portion and side portion of the latch section, form one side of a rectangular frame configured to engage side perimeter surfaces of the portable electronic device, when the portable electronic device has a rectangular perimeter.

15. A battery pack for electrically coupling with and securing to a portable electronic device having a device connector and one or more user interface components, the battery pack comprising:
   an electronics section comprising a battery compartment configured to hold one or more batteries, and a connector mechanism configured to interconnect with and form a waterproof seal around the device connector at an interface of the connector mechanism and the device connector; and
   a latch section coupled to the electronics section and configured to pivot relative to the electronics section to transition the battery pack between:
   an open state during which the electronics section and the latch section together form a u-shaped open frame structure configured to enable installation of the portable electronic device in the battery pack, and
   a closed state during which the electronics section and the latch section form a closed frame structure configured to secure the portable electronic device within an opening defined by the closed frame structure, wherein the connector mechanism comprises:
   a connector configured to interconnect with the device connector; and
   a plug surrounding a portion of the connector,
   wherein the plug is configured to mate with and sealingly engage with a recessed well surrounding the device connector.

16. The battery pack of claim 15, wherein the plug is formed of a thermoplastic polyurethane (TPU) and is dimensioned and configured to fit within the recessed well of the portable electronic device.

17. The battery pack of claim 15, wherein the electronics section comprises:
   a base portion that includes the battery compartment; and
   a side portion that includes the connector mechanism, wherein the side portion extends orthogonally from the base portion and the connector mechanism extends orthogonally from the side portion in a direction toward the opening to thereby enable interconnection between the connector mechanism and the device connector during installation of the portable electronic device.

18. The battery pack of claim 15, wherein the connector mechanism extends outward from a surface of the electronics section and is configured such that a connector of the connector mechanism is capable of articulating in at least one direction relative to the surface of the electronics section.

19. The battery pack of claim 15, wherein one or more of the electronics section and the latch section comprise a feature configured to provide direct access to the one or more user interface components of the portable electronic device when the battery pack is in a closed state.

20. The battery pack of claim 19, wherein the feature comprises a notch or channel formed in a surface of one of the electronics section and the latch section.

21. The battery pack of claim 15, wherein the opening defined by the closed frame structure has a maximum height, a maximum width, and a maximum depth greater than a maximum height, a maximum width, and a maximum depth of the portable electronic device, and a minimum height and a minimum width less than the maximum height and the maximum width of the portable electronic device.

22. The battery pack of claim 15, wherein the electronics section further comprises a track having one or more mechanical features, the track configured to allow for insertion and removal of an interchangeable mounting structure.

23. The battery pack of claim 22, wherein the one or more mechanical features comprise at least one notch configured to engage with at least one protrusion of the interchangeable mounting structure.

24. The battery pack of claim 22, wherein the track is disposed on a portion of both of the electronics portion and the latch portion.

25. The battery pack of claim 15, wherein the battery pack has a front and a rear, and wherein, in its closed state, the electronics section and the latch section, together, define an opening that extends from the front to the rear.

26. The battery pack of claim 15, wherein the electronics section includes a base portion and a side portion that extends orthogonally from the base portion, and
the latch section includes a base portion and a side portion that extends orthogonally from the base portion;
and wherein, in its closed state, each of the base portion and side portion of the electronics section, and the base portion and side portion of the latch section, form one side of a rectangular frame configured to engage side perimeter surfaces of the portable electronic device, when the portable electronic device has a rectangular perimeter.

27. A battery pack for electrically coupling with and securing to a portable electronic device having a device connector and one or more user interface components, the battery pack comprising:
an electronics section comprising a battery compartment configured to hold one or more batteries, and a connector mechanism configured to interconnect with and form a waterproof seal around the device connector at an interface of the connector mechanism and the device connector; and
a latch section coupled to the electronics section and configured to pivot relative to the electronics section to transition the battery pack between:
an open state during which the electronics section and the latch section together form a u-shaped open frame structure configured to enable installation of the portable electronic device in the battery pack,
a closed state during which the electronics section and the latch section form a closed frame structure configured to secure the portable electronic device within an opening defined by the closed frame structure,
wherein the battery pack has a front and a rear, and wherein, in its closed state, the electronics section and the latch section, together, define an opening that extends from the front to the rear.

28. The battery pack of claim 27, wherein the electronics section comprises:
a base portion that includes the battery compartment; and
a side portion that includes the connector mechanism,
wherein the side portion extends orthogonally from the base portion and the connector mechanism extends orthogonally from the side portion in a direction toward the opening to thereby enable interconnection between the connector mechanism and the device connector during installation of the portable electronic device.

29. The battery pack of claim 27, wherein the connector mechanism comprises:
a connector configured to interconnect with the device connector; and
a plug surrounding a portion of the connector,
wherein the plug is configured to mate with and sealingly engage with a recessed well surrounding the device connector.

30. The battery pack of claim 29, wherein the plug is formed of a thermoplastic polyurethane (TPU) and is dimensioned and configured to fit within the recessed well of the portable electronic device.

31. The battery pack of claim 27, wherein the connector mechanism extends outward from a surface of the electronics section and is configured such that a connector of the connector mechanism is capable of articulating in at least one direction relative to the surface of the electronics section.

32. The battery pack of claim 27, wherein one or more of the electronics section and the latch section comprise a feature configured to provide direct access to the one or more user interface components of the portable electronic device when the battery pack is in a closed state.

33. The battery pack of claim 32, wherein the feature comprises a notch or channel formed in a surface of one of the electronics section and the latch section.

34. The battery pack of claim 27, wherein the opening defined by the closed frame structure has a maximum height, a maximum width, and a maximum depth greater than a maximum height, a maximum width, and a maximum depth of the portable electronic device, and a minimum height and a minimum width less than the maximum height and the maximum width of the portable electronic device.

35. The battery pack of claim 27, wherein the electronics section further comprises a track having one or more mechanical features, the track configured to allow for insertion and removal of an interchangeable mounting structure.

36. The battery pack of claim 35, wherein the one or more mechanical features comprise at least one notch configured to engage with at least one protrusion of the interchangeable mounting structure.

37. The battery pack of claim 35, wherein the track is disposed on a portion of both of the electronics portion and the latch portion.

38. The battery pack of claim 27, wherein the electronics section includes a base portion and a side portion that extends orthogonally from the base portion, and the latch section includes a base portion and a side portion that extends orthogonally from the base portion;

and wherein, in its closed state, each of the base portion and side portion of the electronics section, and the base portion and side portion of the latch section, form one side of a rectangular frame configured to engage side perimeter surfaces the portable electronic device, when the portable electronic device has a rectangular perimeter.

\* \* \* \* \*